US009878664B2

(12) United States Patent
Kentley-Klay et al.

(10) Patent No.: US 9,878,664 B2
(45) Date of Patent: Jan. 30, 2018

(54) METHOD FOR ROBOTIC VEHICLE COMMUNICATION WITH AN EXTERNAL ENVIRONMENT VIA ACOUSTIC BEAM FORMING

(71) Applicant: Zoox, Inc., Menlo Park, CA (US)

(72) Inventors: Timothy David Kentley-Klay, Stanford, CA (US); Jesse Sol Levinson, Redwood City, CA (US); Amanda Blair Lind, San Francisco, CA (US)

(73) Assignee: Zoox, Inc., Menlo Park, CA (US)

( * ) Notice: Subject to any disclaimer, the term of this patent is extended or adjusted under 35 U.S.C. 154(b) by 196 days.

(21) Appl. No.: 14/756,993

(22) Filed: Nov. 4, 2015

(65) Prior Publication Data
US 2017/0120814 A1 May 4, 2017

(51) Int. Cl.
*B60Q 9/00* (2006.01)
*G10K 11/26* (2006.01)
*G05D 1/00* (2006.01)

(52) U.S. Cl.
CPC ........... *B60Q 9/008* (2013.01); *G05D 1/0088* (2013.01); *G10K 11/26* (2013.01)

(58) Field of Classification Search
CPC ........ B60Q 9/008; B60Q 1/525; B60Q 5/006; B60Q 1/26; B60Q 1/085; B60Q 1/12;
(Continued)

(56) References Cited

U.S. PATENT DOCUMENTS 5,558,370 A 9/1996 Behr
5,959,552 A 9/1999 Cho
(Continued)

FOREIGN PATENT DOCUMENTS

EP 2549456 1/2013
JP 2011248855 12/2011
(Continued)

OTHER PUBLICATIONS

Final Office action for U.S. Appl. No. 14/932,940, dated Nov. 22, 2016, Levinson et al., "Automated Extraction of Semantic Information to Enhance Incremental Mapping Modifications for Robotic Vehicles", 29 pages.
(Continued)

*Primary Examiner* — Jelani A Smith
(74) *Attorney, Agent, or Firm* — Lee & Hayes, PLLC

(57) ABSTRACT

Systems and methods implemented in algorithms, software, firmware, logic, or circuitry may be configured to process data to determine whether an object external to an autonomous vehicle is a person (e.g., such as a pedestrian) or other classification (e.g., such as a vehicle), and may be further configured to determine a position of the person relative to the autonomous vehicle. Logic may be configured to direct acoustic energy (e.g., via vehicular acoustic beam-forming) to an object external to the autonomous vehicle as an audible acoustic alert. The vehicle-related acoustic beam may be directed to a driver in another vehicle. Logic may be configured to track the motion of external objects, such as a pedestrian crossing from one side of the street to the other, and may correspondingly steer the direction of the vehicle-related acoustic beam(s) to track the person's movement.

28 Claims, 19 Drawing Sheets

(58) Field of Classification Search
CPC ...... B60Q 1/16; B60Q 1/18; B60Q 2300/054; B60Q 2300/112; B60Q 2300/122; B60Q 2300/134; B60Q 2300/142; B60Q 2300/322

See application file for complete search history.

(56) References Cited

U.S. PATENT DOCUMENTS

| | | | |
|---|---|---|---|
| 6,264,353 B1 | 7/2001 | Caraher et al. | |
| 6,301,542 B1 | 10/2001 | Kirchberger et al. | |
| 6,374,168 B1 | 4/2002 | Fujii | |
| 6,728,616 B1 | 4/2004 | Tabe | |
| 6,752,508 B2 | 6/2004 | Kobayashi | |
| 7,106,180 B1* | 9/2006 | Pompei | A01M 29/18 116/22 A |
| 7,426,429 B2 | 9/2008 | Tabe | |
| 7,865,277 B1 | 1/2011 | Larson et al. | |
| 8,123,642 B2 | 2/2012 | Ishikawa et al. | |
| 8,126,642 B2 | 2/2012 | Trepagnier et al. | |
| 8,392,064 B2 | 3/2013 | Thrun et al. | |
| 8,434,919 B2 | 5/2013 | Schofield | |
| 8,670,891 B1 | 3/2014 | Szybalski et al. | |
| 8,825,259 B1* | 9/2014 | Ferguson | G05D 1/0214 104/124 |
| 8,880,272 B1 | 11/2014 | Ferguson et al. | |
| 8,977,007 B1 | 3/2015 | Ferguson et al. | |
| D743,978 S | 11/2015 | Amin | |
| 9,194,168 B1 | 11/2015 | Lu et al. | |
| 9,201,426 B1 | 12/2015 | Bonawitz | |
| 9,384,443 B2 | 7/2016 | Passot et al. | |
| 9,395,727 B1 | 7/2016 | Smith et al. | |
| 2002/0131608 A1 | 9/2002 | Lobb et al. | |
| 2004/0017073 A1 | 1/2004 | Pavlov et al. | |
| 2004/0068354 A1 | 4/2004 | Tabe | |
| 2004/0264207 A1 | 12/2004 | Jones | |
| 2005/0216181 A1 | 9/2005 | Estkowski et al. | |
| 2006/0064202 A1 | 3/2006 | Gutmann et al. | |
| 2006/0089763 A1 | 4/2006 | Barrett et al. | |
| 2006/0175116 A1 | 8/2006 | Friedman et al. | |
| 2006/0207820 A1 | 9/2006 | Joshi et al. | |
| 2007/0096447 A1 | 5/2007 | Tabe | |
| 2007/0246927 A1 | 10/2007 | Okada | |
| 2008/0033645 A1 | 2/2008 | Levinson et al. | |
| 2008/0084283 A1 | 4/2008 | Kalik | |
| 2008/0097699 A1 | 4/2008 | Ono | |
| 2008/0161987 A1 | 7/2008 | Breed | |
| 2008/0309468 A1* | 12/2008 | Greene | G08G 1/166 340/436 |
| 2008/0320421 A1 | 12/2008 | Demaris et al. | |
| 2009/0036090 A1 | 2/2009 | Cho et al. | |
| 2009/0208109 A1 | 8/2009 | Kakinami et al. | |
| 2009/0240647 A1 | 9/2009 | Green et al. | |
| 2009/0276149 A1 | 11/2009 | Kauffman et al. | |
| 2010/0045482 A1 | 2/2010 | Strauss | |
| 2010/0106356 A1 | 4/2010 | Trepagnier et al. | |
| 2011/0122729 A1 | 5/2011 | Hu et al. | |
| 2011/0130111 A1 | 6/2011 | Crandall et al. | |
| 2011/0288684 A1 | 11/2011 | Farlow et al. | |
| 2012/0035846 A1 | 2/2012 | Sakamoto et al. | |
| 2012/0083960 A1 | 4/2012 | Zhu et al. | |
| 2012/0256448 A1 | 10/2012 | Yasui et al. | |
| 2012/0310465 A1 | 12/2012 | Boatright et al. | |
| 2013/0054133 A1 | 2/2013 | Lewis et al. | |
| 2013/0246301 A1 | 9/2013 | Radhakrishnan et al. | |
| 2013/0268138 A1 | 10/2013 | Moughler et al. | |
| 2013/0343071 A1 | 12/2013 | Nagaoka et al. | |
| 2014/0032012 A1 | 1/2014 | Joshi et al. | |
| 2014/0032049 A1 | 1/2014 | Moshchuk et al. | |
| 2014/0088855 A1* | 3/2014 | Ferguson | G08G 1/166 701/117 |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0132407 A1 | 5/2014 | Kumai et al. | |
| 2014/0142830 A1 | 5/2014 | Bernzen et al. | |
| 2014/0185880 A1 | 7/2014 | Fairfield et al. | |
| 2014/0188347 A1 | 7/2014 | Tabe | |
| 2014/0214255 A1 | 7/2014 | Dolgov et al. | |
| 2014/0214260 A1 | 7/2014 | Eckert et al. | |
| 2014/0244151 A1 | 8/2014 | Matsubara et al. | |
| 2014/0257661 A1 | 9/2014 | Schulman et al. | |
| 2014/0303827 A1 | 10/2014 | Dolgov et al. | |
| 2014/0309833 A1 | 10/2014 | Ferguson et al. | |
| 2014/0333468 A1 | 11/2014 | Zhu et al. | |
| 2014/0336935 A1 | 11/2014 | Zhu et al. | |
| 2014/0358353 A1 | 12/2014 | Ibanez-Guzman et al. | |
| 2014/0358427 A1 | 12/2014 | Fuhrman | |
| 2015/0025708 A1 | 1/2015 | Anderson | |
| 2015/0039157 A1 | 2/2015 | Wolfe et al. | |
| 2015/0039391 A1 | 2/2015 | Hershkovitz et al. | |
| 2015/0057871 A1 | 2/2015 | Ono et al. | |
| 2015/0091374 A1 | 4/2015 | Lenius et al. | |
| 2015/0094850 A1 | 4/2015 | Passot et al. | |
| 2015/0127224 A1 | 5/2015 | Tabe | |
| 2015/0127239 A1 | 5/2015 | Breed et al. | |
| 2015/0149019 A1 | 5/2015 | Pilutti et al. | |
| 2015/0149088 A1 | 5/2015 | Attard et al. | |
| 2015/0160024 A1 | 6/2015 | Fowe | |
| 2015/0248131 A1 | 9/2015 | Fairfield et al. | |
| 2015/0254986 A1 | 9/2015 | Fairfield et al. | |
| 2015/0258928 A1 | 9/2015 | Goto et al. | |
| 2015/0268665 A1 | 9/2015 | Ludwick et al. | |
| 2015/0271290 A1 | 9/2015 | Tao et al. | |
| 2015/0292894 A1 | 10/2015 | Goddard et al. | |
| 2015/0298636 A1 | 10/2015 | Furst | |
| 2015/0336502 A1 | 11/2015 | Hillis et al. | |
| 2015/0336524 A1 | 11/2015 | Larner et al. | |
| 2015/0338226 A1 | 11/2015 | Mason et al. | |
| 2015/0338852 A1 | 11/2015 | Ramanujam | |
| 2015/0339928 A1 | 11/2015 | Ramanujam | |
| 2015/0346727 A1 | 12/2015 | Ramanujam | |
| 2015/0348221 A1 | 12/2015 | Pedersen et al. | |
| 2015/0356368 A1 | 12/2015 | Liu et al. | |
| 2015/0359032 A1 | 12/2015 | Menard et al. | |
| 2015/0370251 A1 | 12/2015 | Siegel et al. | |
| 2015/0375764 A1 | 12/2015 | Rajendra et al. | |
| 2016/0016315 A1 | 1/2016 | Kuffner, Jr. et al. | |
| 2016/0071278 A1 | 3/2016 | Leonard et al. | |
| 2016/0107703 A1 | 4/2016 | Briceno et al. | |
| 2016/0159402 A1 | 6/2016 | Nakaya et al. | |
| 2016/0159407 A1 | 6/2016 | Holmstrom et al. | |
| 2016/0165775 P1 | 6/2016 | Maillard et al. | |
| 2016/0165786 P1 | 6/2016 | Giesen | |
| 2016/0189544 A1 | 6/2016 | Ricci | |
| 2016/0209220 A1 | 7/2016 | Laetz | |
| 2016/0247106 A1 | 8/2016 | Dalloro et al. | |
| 2016/0247109 A1 | 8/2016 | Scicluna et al. | |
| 2016/0362045 A1* | 12/2016 | Vegt | H04W 4/00 |
| 2017/0120803 A1 | 5/2017 | Kentley et al. | |
| 2017/0120804 A1 | 5/2017 | Kentley et al. | |
| 2017/0120904 A1 | 5/2017 | Kentley et al. | |

FOREIGN PATENT DOCUMENTS

| | | |
|---|---|---|
| WO | WO2009151781 A1 | 12/2009 |
| WO | 2011154681 A1 | 12/2011 |

OTHER PUBLICATIONS

Office action for U.S. Appl. No. 14/932,959, dated Dec. 2, 2016, Kentley et al., "Autonomous Vehicle Fleet Service and System", 21 pages.

Stanford Autonomous Driving Team website <http://driving.stanford.edu/papers.html>; Various; Stanford University 2014. (1 page).

U.S. Appl. No. 14/756,991, filed Nov. 4, 2015, Levinson, et al., "Sensor-based object-detection optimization for autonomous vehicles", (127 pages).

U.S. Appl. No. 14/756,992, filed Nov. 4, 2015, Levinson, et al., "Adaptive autonomous vehicle planner logic", (117 pages).

U.S. Appl. No. 14/756,994, filed Nov. 4, 2015, Kentley, et al., "System of configuring active lighting to indicate directionality of an autonomous vehicle", (141 pages).

(56) References Cited

OTHER PUBLICATIONS

U.S. Appl. No. 14/756,995, filed Nov. 4, 2015, Kentley, et al., "Coordination of dispatching and maintaining fleet of autonomous vehicles", (131 pages).
U.S. Appl. No. 14/756,996, filed Nov. 4, 2015, Douillard, et al., "Calibration for Autonomous Vehicle Operation", (133 pages).
U.S. Appl. No. 14/757,015, filed Nov. 5, 2015, Levinson, et al., "Independent steering, power torque control and transfer in autonomous vehicles", (27 pages).
U.S. Appl. No. 14/757,016, filed Nov. 5, 2015, Levinson, et al., "Simulation system and methods for autonomous vehicles", (131 pages).
U.S. Appl. No. 14/932,940, filed Nov. 4, 2015, Levinson, et al., "Automated Extraction of Semantic Information to Enhance Incremental Mapping Modifications for Robotic Vehicles", (130 pages).
U.S. Appl. No. 14/932,948, filed Nov. 4, 2015, Kentley, et al., "Active Lighting Control for Communicating a State of an Autonomous Vehicle to Entities in a Surrounding Environment", (123 pages).
U.S. Appl. No. 14/932,952, filed Nov. 4, 2015, Kentley, et al., "Resilient Safety System for a Robotic Vehicle", (125 pages).
U.S. Appl. No. 14/932,954, filed Nov. 4, 2015, Kentley, et al., "Internal Safety Systems for Robotic Vehicles", (127 pages).
U.S. Appl. No. 14/932,958, filed Nov. 4, 2015, Kentley, "Quadrant Configuration of Robotic Vehicles", (57 pages).
U.S. Appl. No. 14/932,959, filed Nov. 4, 2015, Kentley, et al., Titled "Autonomous Vehicle Fleet Service and System", (103 pages).
U.S. Appl. No. 14/932,962, filed Nov. 4, 2015, Kentley, et al., "Robotic Vehicle Active Safety Systems and Methods", (109 pages).
U.S. Appl. No. 14/932,963, filed Nov. 4, 2015, Levinson, et al., "Adaptive Mapping to Navigate Autonomous Vehicles Responsive to Physical Environment Changes", (133 pages).
U.S. Appl. No. 14/932,966, filed Nov. 4, 2015, Levinson, et al., "Teleoperation System and Method for Trajectory Modification of Autonomous Vehicles" (131 pages).
U.S. Appl. No. 14/933,469, filed Nov. 5, 2015, Kentley, et al., "Software Application to Request and Control an Autonomous Vehicle Service", (146 pages).
U.S. Appl. No. 14/933,602, filed Nov. 5, 2015, Levinson, et al., "Machine-Learning Systems and Techniques to Optimize Teleoperation and/or Planner Decisions" (123 pages).
U.S. Appl. No. 14/933,665, filed Nov. 5, 2015, Kentley, et al., "Software Application and Logic to Modify Configuration of an Autonomous Vehicle" (144 pages).
U.S. Appl. No. 14/933,706, filed Nov. 5, 2015, Kentley, et al., "Interactive Autonomous Vehicle Command Controller", (145 pages).
Office action for U.S. Appl. No. 14/932,948, dated Oct. 14, 2016, Kentley et al., "Active Lighting Control for Communicating a State of an Autonomous Vehicle to Entities in a Surrounding Environment", (15 pages).
Office action for U.S. Appl. No. 14/756,995, dated Oct. 31, 2016, Kentley et al., "Coordination of dispatching and maintaining fleet of autonomous vehicles", (35 pages).
Office action for U.S. Appl. No. 14/932,954, dated Mar. 29, 2016, Kentley et al., "Internal Safety Systems for Robotic Vehicles", (17 pages).
Office Action for U.S. Appl. No. 14/933,602, dated Nov. 5, 2015, Levinson et al., "Machine-Learning Systems and Techniques to Optimize Teleoperation and/or Planner Decisions", (11 pages).
Office action for U.S. Appl. No. 14/933,469, dated Aug. 30, 2016, Kentley et al., "Software Application to Request and Control an Autonomous Vehicle Service", 11 pages.
Office Action for U.S. Appl. No. 14/932,952, dated Jun. 24, 2016, Kentley et al., "Resilient Safety System for a Robotic Vehicle", 11 pages.
Bodensteiner et al., "Monocular Camera Trajectory Optimization using LiDAR Data", IEEE International Conference on computer Vision Workshops, 2011, 8 pages.

Office action for U.S. Appl. No. 14/932,962, dated Mar. 21, 2016, Kentley et al., "Robotic Vehicle Active Safety Systems and Methods", 18 pages.
Office action for U.S. Appl. No. 14/932,963, dated Mar. 17, 2016, Levinson et al., "Adaptive Mapping to Navigate Autonomous Vehicles Responsive to Physical Environment Changes", 26 pages.
Office action for U.S. Appl. No. 14/932,940, dated May 4, 2016, Levinson et al., "Automated Extraction of Semantic Information to Enhance Incremental Mapping Modifications for Robotic Vehicles", 22 pages.
Combining 3D Shape, Color, and Motion for Robust Antime Tracking; Held, David, Levinson, Jesse, Thrun, Sebastian, Savarese, Silvio, Robotics: Science and Systems (RSS), Berkeley, California, USA (2014).
Group Induction; Teichman, Alex, Thrun, Sebastian, Proc. of the IEEE/RSJ Intl Conf on Intelligent Robotics and Systems (IROS) (2013).
Automatic Online Calibration of Cameras and Lasers; Levinson, Jesse, Thrun, Sebastian; Robotics: Science and Systems (RSS) (2013).
Precision Tracking With Sparse 3D and Dense Color 2D Data; Held, David, Levinson, Jesse, Thrun, Sebastian; International Conference on Robotics and Automation (ICRA) (2013).
Automatic Calibration of Cameras and Lasers in Arbitrary Scenes; Levinson, Jesse, Thrun, Sebastian; International Symposium on Experimental Robotics (ISER) (2012).
Online, Semi-Supervised Learning for Long-Term Interaction With Object Recognition Systems; Teichman, Alex, Thrun, Sebastian, RSS Workshop on Long-Term Operation of Autonomous Robotic Systems in Changing Environments (2012).
Tracking-Based Semi-Supervised Learning; Teichman, Alex, Thrun, Sebastian; International Journal of Robotics Research (IJRR); http://ijr.sagepub.com/content/31/7/804; (2012).
A Probabilistic Framework for Object Detection in Images Using Context and Scale; Held, David, Levinson, Jesse, Thrun, Sebastian; International Conference on Robotics and Automation (ICRA) (2012).
Practical Object Recognition in Autonomous Driving and Beyond; Teichman, Alex, Thrun, Sebastian; IEEE Workshop on Advanced Robotics and its Social Impacts (ARSO) (2011).
Tracking-Based Semi-Supervised Learning; Teichman, Alex, Thrun, Sebastian; Robotics: Science and Systems (RSS) (2011).
Towards 3D Object Recognition Via Classification of Arbitrary Object Tracks; Teichman, Alex, Levinson, Jesse, Thrun, Sebastian; International Conference on Robotics and Automation (ICRA) (2011).
Towards Fully Autonomous Driving: Systems and Algorithms; Levinson, Jesse et al.; Intelligent Vehicles Symposium (2011)
Traffic Light Mapping, Localization, and State Detection for Autonomous Vehicles; Levison, Jesse, Askeland, Jake, Dolson, Jennifer, Thrun, Sebastian; International Conference on Robotics and Automation (ICRA) (2011).
Automatic Laser Calibration, Mapping, and Localization for Autonomous Vehicles, Levison, Jesse; Thesis (Ph D); Stanford University (2011).
Unsupervised Calibration for Multi-Beam Lasers; Levinson, Jesse, Thrun, Sebastian, International Symposium on Experimental Robotics (ISER) (2010).
Robust Vehicle Localization in Urban Environments Using Probabilistic Maps; Levinson, Jesse, Thrun, Sebastian; International Conference on Robotics and Automation (ICRA) (2010).
Exponential Family Sparse Coding With Application to Self-Taught Learning; Honglak, Lee, Raina, Rajat, Teichman, Alex, Ng, Andrew Y.; International Joint Conference on Artificial Intelligence (IJCAI) (2009).
Map-Based Precision Vehicle Localization in Urban Environments; Levinson, Jesse, Thrun, Sebastian; Robotics: Science and Systems (RSS) (2007).
Stanford Autonomous Driving Team website <http://driving.stanford.edu/papers.html>; Various; Stanford University 2014.
Combining Data-Driven and Model-Based Cues for Segmentation of Video Sequences; Eckes, Christian, Vorbruggen, Jan C.; Proceedings WCNN '96, San Diego, USA (1996).

(56) References Cited

OTHER PUBLICATIONS

A Real-Time Motion Planner With Trajectory Optimization for Autonomous Vehicles; Xu, Wenda et al.; Robotics and Automation (ICRA); Saint Paul, MN, USA (2012).
Dynamic Real-Time Replanning in Belief Space: An Experimental Study on Physical Mobile Robots; Agha-mohammadi, Ali-Akbar et al.; Technical Report TR 13-007; Texas A&M University, USA (2013).
An Evaluation of Dynamic Object Tracking With 3D Lidar; Morton, P., Douillard, B., Underwood, J.; Proceedings of Australasian Conference on Robotics and Automation; Dec. 7-9, 2011; Melbourne, Australia (2011).
Control of Robotic Mobility—On Demand Systems: A Queueing-Theoretical Perspective; Zhang, Rick, Pavone, Marco; Intl Journal of Robotics Research, pp. 1-18, Stanford, USA (2015).
Evaluation of Urban Vehicle Routing Algorithms; Kong, Linghe et al.; Intl Journal of Digital Content Technology and its Applications (JDCTA); vol. 6, No. 23, University of New Mexico, USA (2012).
Real-Time High Resolution Fusion of Depth Maps on GPU; Trifonov, Dmitry; Intl Conference on Computer-Aided Design and Computer Graphics (CAD/Graphics); Guangzhou, China (2013).
Real-Time Image Segmentation on a GPU; Abramov, Alexey et al.; Facing the Multi-Core Challenge, pp. 131-142, Berlin, German (2010).
A Tutorial on Graph-Based Slam; Grisetti, Giorgio et al.; Intelligent Transportation Systems Magazine, IEEE; pp. 31-43 (2010).
Sensor Fusion and Calibration of Inertial Sensors, Vision, Ultra-Wideband and GPS; Hol, Jeroen; Linkoping Studies in Science and Technology, Dissertations No. 1368; Department of Electrical Engineering; Linkoping University, SE-581 83 Linkoping, Sweden; (2011).
Large Scale Dense Visual Inertial Slam; Ma, Lu et al.; Field and Service Robotics (FSR); (2015).
Simultaneous Localization, Mapping, and Manipulation for Unsupervised Object Discovery; Ma, Lu et al.; IEEE International Conference on Robotics and Automation (ICRA); (2014).
Online Slam With Any-Time Self-Calibration and Automatic Change Detection; Nima Keivan and Gabe Sibley; IEEE International Conference on Robotics and Automation (ICRA); (2014).
Bayazit et al., "Swarming Behavior Using Probabilistic Roadmap Techniques", Swarm Robotics WS 2004, LNCS, Springer-Verlag Berlin Heidelberg 2005, pp.#112-pp.#125.
Easymile (website), Retrieved from <<https://web.archive.org/web/20150723060050/http://easymile.com>> Jul. 2015, <<https://web.archive.org/web/201508012054107/http://easymile.com/mobility-soulition/>>, Aug. 2015, and <<http:www.youtube.com/watch?v=fijDBL76yDY>>, Feb. 2015, 13 pages.
Office action for U.S. Appl. No. 14/932,963, dated Aug. 15, 2016, Levinson et al., "Adaptive Mapping to Navigate Autonomous Vehicles Responsive to Physical Environment Changes", 15 pages.
Office action for U.S. Appl. No. 14/756,992, dated Aug. 25, 2016, Levinson et al., "Adaptive autonomous vehicle planner logic", 9 pages.
Office action for U.S. Appl. No. 14/932,959, dated Aug. 5, 2016, Kentley et al., "Autonomous Vehicle Fleet Service and System", 16 pages.
Mertz, et al., "Collision Warning and Sensor Data Processing in Urban Areas", retrieved on Jun. 3, 2015 at <<http://repository.cmu.edu/cgi/viewcontent.cgi?article=1063&context=robotics>>, Research Showcase at Carnegie Mellon University, Robotics Commons, Jun. 1, 2005, 8 pages.
Office action for U.S. Appl. No. 14/756,994, dated Jan. 26, 2017, Kentley et al., "System of configuring active lighting to indicate directionality of an autonomous vehicle", 18 pages.
Office action for U.S. Appl. No. 14/932,948, dated Mar. 21, 2017, Kentley et al., "Active Lighting Control for Communicating a State of an Autonomous Vehicle to Entities in a Surrounding Environment", 19 pages.
PCT Invitation to Pay Additional Fees dated Feb. 9, 2017 for PCT Application No. PCT/US16/60183, 7 pages.
Abramov et al., "Real-Time Image Segmentation on a GPU," Facing the Multi-Core Challenge, pp. 131-142, Berlin, German (2010), 13 pages.
Agha-mohammadi et al., "Dynamic Real-Time Replanning in Belief Space: An Experimental Study on Physical Mobile Robots," Technical Report TR 13-007; Texas A&M University, USA (2013), 26 pages.
Eckes et al., "Combining Data-Driven and Model-Based Cues for Segmentation of Video Sequences," Proceedings WCNN '96, San Diego, USA, Sep. 1996, 8 pages.
Grisetti et al., "A Tutorial on Graph-Based Slam," Intelligent Transportation Systems Magazine, IEEE; pp. 31-43 (2010), 11 pages.
Held et al., "A Probabilistic Framework for Object Detection in Images Using Context and Scale," International Conference on Robotics and Automation ICRA, Sep. 16, 2011, 7 pages.
Held et al., "Combining 3D Shape, Color, and Motion for Robust Antime Tracking," Robotics: Science and Systems (RSS), Berkeley, California, USA (2014), 10 pages.
Held et al., "Precision Tracking With Sparse 3D and Dense Color 2D Data," International Conference on Robotics and Automation (ICRA) (2013), 8 pages.
Hol et al., "Sensor Fusion and Calibration of Inertial Sensors, Vision, Ultra-Wideband and GPS," Linkoping Studies in Science and Technology, Dissertations No. 1368; Department of Electrical Engineering; Linkoping University, SE-581 83 Linkoping, Sweden; (2011), 162 pages.
Honglak et al., "Exponential Family Sparse Coding With Application to Self-Taught Learning," International Joint Conference on Artificial Intelligence (IJCAI) (2009), 7 pages.
Keivan et al., "Online Slam With Any-Time Self-Calibration and Automatic Change Detection," IEEE International Conference on Robotics and Automation (ICRA); (2014), 8 pages.
Kong et al., "Evaluation of Urban Vehicle Routing Algorithms," Intl Journal of Digital Content Technology and its Applications (JDCTA); vol. 6, No. 23, University of New Mexico, USA (2012), 10 pages.
PCT Search Report and Written Opinion dated Mar. 30, 2017 for PCT Application No. PCT/US16/60183, 19 pages.
PCT Search Report and Written Opinion dated Jun. 8, 2017 for PCT Application No. PCT/US16/60161, 10 pages.

\* cited by examiner

METHOD FOR ROBOTIC VEHICLE COMMUNICATION WITH AN EXTERNAL ENVIRONMENT VIA ACOUSTIC BEAM FORMING

CROSS-REFERENCE TO RELATED APPLICATIONS

This application is related to U.S. patent application Ser. No. 14/932,959, filed Nov. 4, 2015, entitled "Autonomous Vehicle Fleet Service And System," U.S. patent application Ser. No. 14/932,963, filed Nov. 4, 2015, entitled "Adaptive Mapping To Navigate Autonomous Vehicles Responsive To Physical Environment Changes," and U.S. patent application Ser. No. 14/932,962, filed Nov. 4, 2015, entitled "Robotic Vehicle Active Safety Systems And Methods," all of which are hereby incorporated by reference in their entirety for all purposes.

FIELD

Embodiments of the present application relate generally to methods, systems and apparatus for safety systems in robotic vehicles.

BACKGROUND

Autonomous vehicles, such as the type configured to transport passengers in an urban environment, may encounter many situations in which an autonomous vehicle ought to alert persons, vehicles, and the like, of the presence of the vehicle in order to avert a potential collision or an approach of the vehicle within an unsafe distance of an external object, such as a pedestrian for example.

As one example, in a conventional vehicle piloted by a human being, a pedestrian who crosses the road in front of the vehicle may be jaywalking or may not be paying attention to the approach of the vehicle. In some scenarios, the driver of the vehicle may decide to use the vehicle's horn to alert the pedestrian. However, a horn will typically have an acoustic radiation pattern that is sub-optimal and may not be sufficient to warn the pedestrian that the horn being honked is intended for him/her. Instead, other pedestrians or other drivers in the vicinity of the vehicle may believe the horn is being honked at them. Moreover, a pattern of the sound waves emitted by the horn may make it difficult to localize the source of the horn. From the perspective of the pedestrian, the horn may be perceived as coming from another vehicle. Furthermore, the horn may cause the pedestrian to look in a direction other than the direction of the vehicle that generated the horn honk, thereby potentially distracting the pedestrian from the actual source of the horn.

Finally, autonomous vehicles may share the road with other vehicles and persons. However, autonomous vehicles may be difficult to audibly detect due to low levels of emitted noise from an electric and/or hybrid propulsion system (e.g., lack of combustion engine noise and/or lower levels of tire noise).

Therefore, in situations where the autonomous vehicle intends to issue an audible alert, a targeted and/or more socially acceptable sound source (e.g., less rude than a horn) may be desirable. Accordingly, there is a need for systems, apparatus and methods for implementing focused acoustic alerts from robotic vehicles.

BRIEF DESCRIPTION OF THE DRAWINGS

Various embodiments or examples ("examples") are disclosed in the following detailed description and the accompanying drawings.

Figure 1:
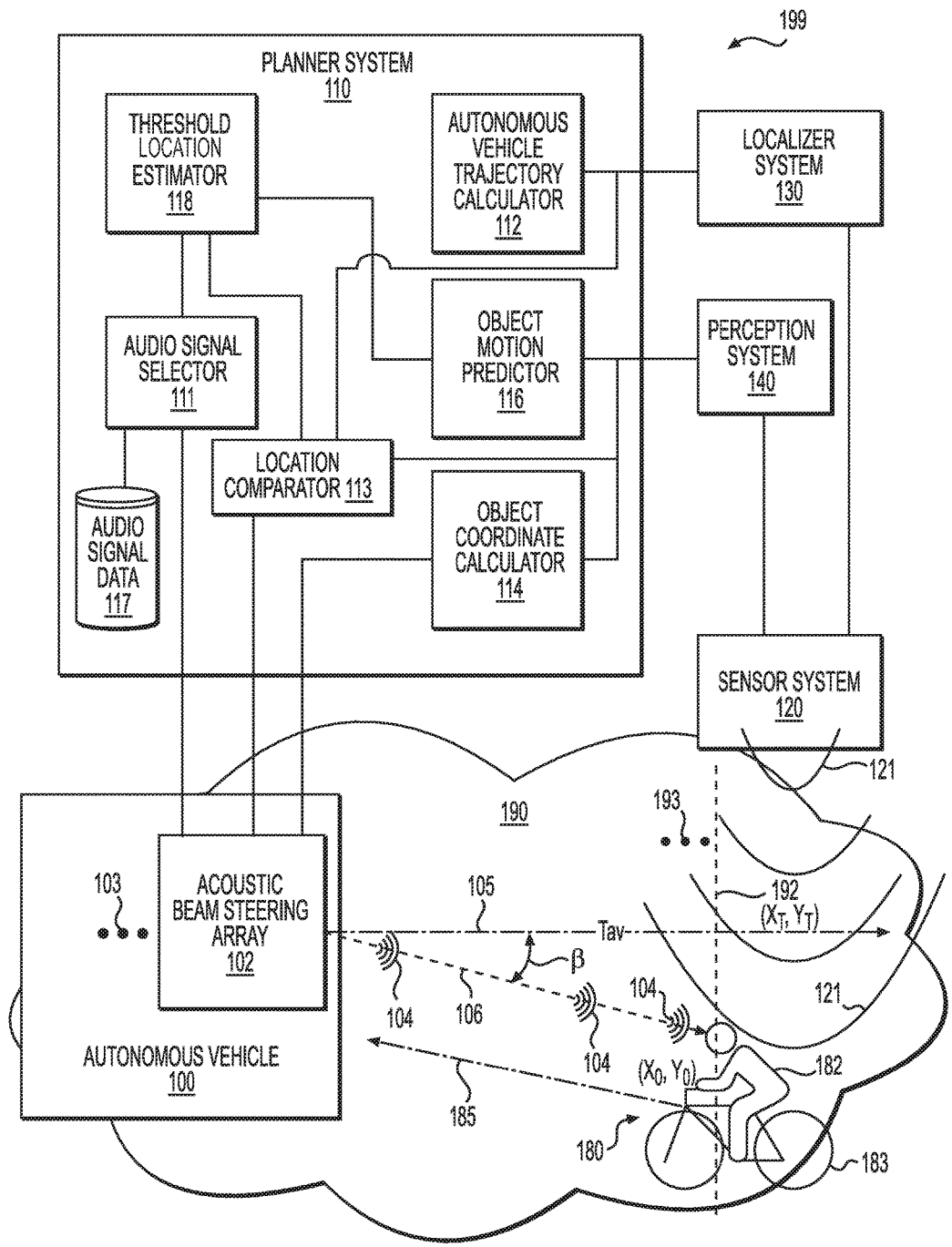
FIG. 1 depicts one example of a system to implement an acoustic beam steering array in an autonomous vehicle.

Although the above-described drawings depict various examples of the invention, the invention is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, a method, an apparatus, a user interface, software, firmware, logic, circuity, or a series of executable program instructions embodied in a non-transitory computer readable medium. Such as a non-transitory computer readable medium or a computer network where the program instructions are sent over optical, electronic, or wireless communication links and stored or otherwise fixed in a non-transitory computer readable medium. Examples of a non-transitory computer readable medium includes but is not limited to electronic memory, RAM, DRAM, SRAM, ROM, EEPROM, Flash memory, solid-state memory, hard disk drive, volatile and non-volatile memory, for example. One or more non-transitory computer readable media may be distributed over a number of devices. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

FIG. 1 depicts one example 199 of a system to implement an acoustic beam steering array in an autonomous vehicle. In FIG. 1, an autonomous vehicle 100 may include a planner system 110, a sensor system 120, a localizer system 130 and a perception system 140. The planner system 110 may receive data from the localizer system 130 and the perception system 140. Sensor system 120 may sense (e.g., 121) an environment 190 external to the autonomous vehicle 100. Sensor data from the sensor system 120 may be received by the localizer system 130 and the perception system 140. Localizer system 130 may use the sensor data from sensor system 120 and may use other data (e.g., map data) to implement a localization process that determines a location of the autonomous vehicle in the environment 190. Perception system 140 may use the sensor data from sensor system 120 to implement a perception process that determines where objects are positioned (e.g., a location and/or a coordinate of the object) in environment 190. Object data from perception system 140 and location data (e.g., position and orientation (POSE) data) from localization system 130 may be received by planner system 110 to perform one or more functions, such as driving operations of the autonomous vehicle 100. Driving operation may include but is not limited to calculating and controlling autonomous vehicle 100 trajectory, generating steering inputs to a steering system of the autonomous vehicle 100, controlling a brake system of the autonomous vehicle 100, controlling safety systems of the autonomous vehicle 100, controlling a propulsion system of the autonomous vehicle 100, and broadcasting acoustics alerts into the environment 190 external to the autonomous vehicle 100 using an acoustic beam steering array 102 that is positioned on the autonomous vehicle 100 (e.g., on an exterior of the vehicle 100).

Objects positioned in the environment 190 may be detected by perception system 140 using sensor data generated by sensor system 120. As one example, one or more sensors (e.g., a suite of different sensor types) in sensor system 120 may detect (using active and/or passive sensing) an object 180 positioned in environment 190. Perception system 140 may process the sensor data to detect the object 180, classify the object 180 (e.g., as a bicycle 183 and rider 182), determine an object track associated with the object 180 (e.g., determine if the object 180 is a static object (not in motion) or a dynamic object (in motion)), a location of object 180 in environment 190 (e.g., a location or a coordinate relative to a location of autonomous vehicle 100), and may track the object 180 (e.g., track changes in location of object 180). Although FIG. 1 depicts a single object 180, environment 190 may include numerous other objects (not depicted) including but not limited to pedestrians, automobiles, roads, traffic lights, street signs, buildings, road markings, trees, fire hydrants, and other on-road and off-road infrastructure, for example.

In the example of FIG. 1, object 180 is depicted as having a trajectory 185 (e.g., a changing location in the environment 190) that may potentially conflict with a trajectory 105 (Tav) of the autonomous vehicle 100. A conflicting trajectory between an object in the external environment 190 and the autonomous vehicle 100 may be, but need not always be, one that may result in a collision between the autonomous vehicle 100 and the object. A conflicting trajectory may include a trajectory of the object that may, if not altered, result in the autonomous vehicle 100 and the object coming into an unsafe proximity of each other (e.g., a distance of about two feet or less). As another example, a conflicting trajectory may include a trajectory of the object that may, if not altered, result in the trajectories intersecting each other at location in the environment 190 that is in the path of travel of the autonomous vehicle 100, the object or both.

Planner system 110 may receive POSE data from localizer system 130 and object data from perception system 140 and may process the received data (e.g., using on or more compute engines and/or algorithms) to calculate (e.g., at a trajectory calculator 112) a trajectory of the autonomous vehicle 100 in environment 190, predict (e.g., at an object motion predictor 116) motion of the object 180 in environment 190, calculate (e.g., at an object coordinate calculator 114) a coordinate of the object 180 in environment 190 (e.g., based on data representing a location of the object in the environment), calculate (e.g., at a threshold location estimator 118) a threshold location in the environment to trigger an acoustic alert, compare (e.g., at a location comparator 113) a location of the object 180 within the threshold location and trigger the acoustic alert when the location of the object 180 and the threshold location match (e.g., are coincident with each other), and select (e.g., using an audio signal selector 111) an audio signal (e.g., accessed from audio signal data 117) for the acoustic alert. Planner system 110 may use data representing the location of the object in the environment, the data representing the coordinate of the object in the environment, or both.

Object motion predictor 116 may be configured to implement motion prediction based on one or more datum included in the object data. For example, object motion predictor 116 may process data representing object classification to determine data representing an object type (e.g., a skateboard rider, an ambulance, a truck, a wheelchair, etc.), and may process data representing a location of the object in the environment 190 to predict data representing a predicted motion of the object. As one example, a runner who is jogging down a bike line on a street may be predicted to be more likely (e.g., >50%) to alter its trajectory from the bike lane and into the street, leading to a potential trajectory conflict with the autonomous vehicle 100. As another example, a runner who is jogging down a sidewalk parallel to a street may be predicted to be less likely (e.g., <50%) to alter its trajectory from the sidewalk and into the street; therefore, having a reduce potential for a conflicting trajectory with autonomous vehicle 100.

Object coordinate calculator 114 may be configured to process data representing a location of the object in the environment to calculate a coordinate of the object. The coordinate calculated may be based on two or more Cartesian coordinates (e.g., X and Y), polar coordinates, or an angle, for example. The coordinate calculated by the object coordinate calculator 114 may be relative to a location of the autonomous vehicle 100 and/or a reference location on the autonomous vehicle 100, such as a reference point on the acoustic beam steering array 102.

Autonomous vehicle trajectory calculator 112 may be configured to receive data representing a location of the autonomous vehicle in the environment 190, such as the aforementioned position and orientation data (POSE data). Threshold location estimator 118 may receive the data representing the location of the autonomous vehicle 100 and the data representing the predicted motion of the object to estimate data representing a threshold location in the environment to trigger an acoustic alert using the acoustic beam steering array 102.

Location comparator 113 may receive the data representing the threshold location and the data representing the location of the object to determine when the data representing the threshold location and the data representing the location of the object match (e.g., are coincident with each other) and may generate data representing a trigger signal when the two locations match.

Audio signal selector 111 may select data representing an audio signal to be used to generate the acoustic alert using array 102. In some examples, one or more audio signals may be selected by the audio signal selector 111. For example, audio signal selector 111 may select several audio signals, with each audio signal selected being representative of a different threat level. The threat level may be based on a distance of the object from the autonomous vehicle 100. The closer the object is to the autonomous vehicle 100, the greater the likelihood that a collision may occur, and the greater the threat level that may be audibly conveyed by the selected audio signal. Threshold location estimator 118 may estimate more than one threshold location in environment 190 and audio signal selector 111 may select data representing the audio signal that is different for each threshold location. For example, if three threshold locations are estimated, audio signal selector 111 may select three different audio signals for each of the three threshold locations. Each audio signal may be configured to convey a different threat level as described above.

Planner system 110 may output the data representing the audio signal, the data representing the trigger signal and the data representing the location (or coordinate) of the object (e.g., object 180) to the acoustic beam steering array 102. Acoustic beam steering array 102 may be configured to emit a beam of steered acoustic energy 104 indicative of the data representing the audio signal (e.g., the acoustic energy reproduces the sound encoded in the audio signal). The beam of steered acoustic energy 104 may have a direction of propagation 106 determined by the data representing the coordinate of the object 180, or by the data representing the location of the object. The data representing the coordinate of the object 180 may be an angle, a polar coordinate, a Cartesian coordinate, or other coordinate system, for example.

In FIG. 1, the data representing the coordinate of the object 180 is depicted as being an angle β (Beta). The angle β may be computed relative to the trajectory 105 of the autonomous vehicle 100 and may be referenced to a reference location on the autonomous vehicle 100 (e.g., a point on the array 102). Location comparator 113 may compare the data representing the location of object 180 with a threshold location 192 as determined by threshold location estimator 118. Traveling along trajectory 185, object 180 may cross or otherwise have its location (e.g., $X_O$, $Y_O$) coincident with threshold location 192 (e.g., $X_T$, $Y_T$). When the locations match (e.g. $X_O \approx X_T$ and/or $Y_O \approx Y_T$), location comparator 113 may generate the data representing the trigger signal. Data other than the data representing the trigger signal may be generated when the locations are determined to be coincident with each other (e.g., the locations match).

Upon receiving the data representing the audio signal, the data representing the trigger signal and the data representing the location (or coordinate) of the object (e.g., object 180) the array 102 may emit the beam of steered acoustic energy 104 at the object 180 along the direction of propagation 106. There may be more than one threshold location 192 as denoted by 193, and as the location of the object 180 changes (e.g., as trajectory 185 brings object 180 closer in proximity to the location of autonomous vehicle 100), planner system 110 may continue to receive updated object data from perception system 140 and POSE data from localization system 130, and may use the updated data to generate additional acoustic alerts (e.g., using different audio signal data) from array 102 as the location of object 180 crosses additional threshold locations. For example, if the acoustic alert emitted by array 102 at threshold location 192 fails to cause a change in behavior of object 180 (e.g., cause a trajectory change to a trajectory that does not conflict with the trajectory of the vehicle 100), then at the next threshold location, the data representing the audio signal may be selected to convey a more urgent warning due to a closer proximity of the object to vehicle 100 and/or it's trajectory 105. Subsequently, acoustic alerts may be emitted from array 102 to convey even higher levels of urgency. Acoustic alerts that are not acted upon (e.g., are ignored or not understood by object 180) may result in the planner system 110 taking action to avoid a collision and/or a close pass between the vehicle 100 and object 180. Planner system 110 may generate data representing drive commands (e.g., to steering, braking, signaling and propulsion systems of vehicle 100) that are configured to cause the vehicle 100 to alter its trajectory, location or both to avoid a collision with the object.

Figure 2A:
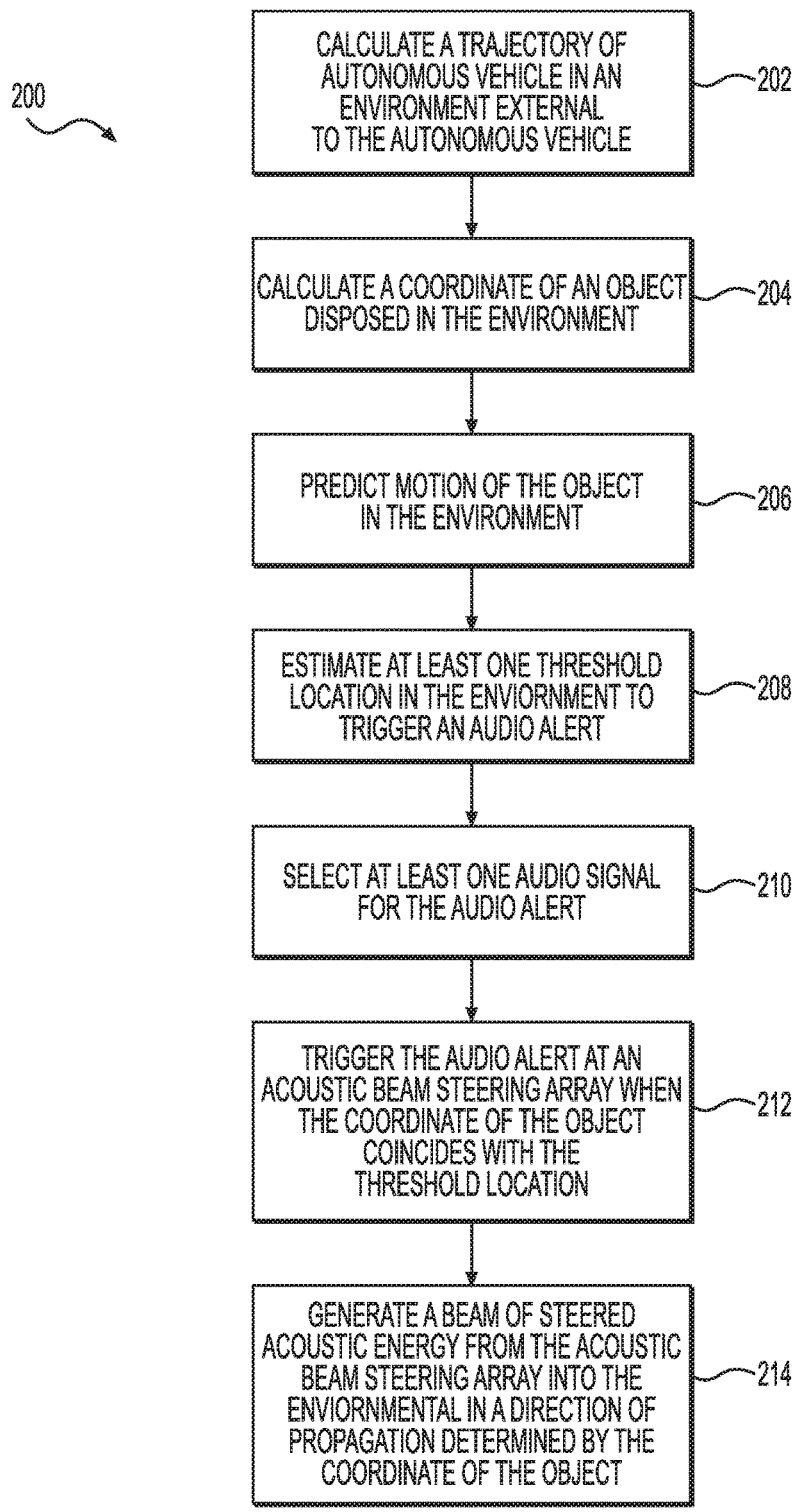
FIG. 2A depicts one example of a flow diagram for implementing acoustic beam steering in an autonomous vehicle.

FIG. 2A depicts one example of a flow diagram 200 for implementing acoustic beam steering in an autonomous vehicle (e.g., autonomous vehicle 100 using acoustic beam steering array 102). In flow 200, one or more systems of the autonomous vehicle may implement one or more stages of flow 200. At a stage 202, a trajectory of an autonomous vehicle in an environment external to the autonomous vehicle may be calculated. The trajectory that is calculated may be data representing a trajectory of the autonomous vehicle (e.g., POSE data) in the environment. At a stage 204, a coordinate of an object positioned in the environment external to the autonomous vehicle may be calculated. The coordinate that is calculated may be data representing a coordinate, such as a Cartesian coordinate, a polar coordinate, or an angle, for example. In some examples, the stage 204 may calculate data representing a location of the object in the environment. At a stage 206, motion of the object in the environment external to the autonomous vehicle may be predicted. A predicted motion of the object in the environment may be determined using data representing an object type for the object and data representing a location of the object in the environment. At a stage 208, one or more threshold locations in the environment at which to trigger an acoustic alert (e.g., by the acoustic beam steering array 102 in FIG. 1) may be estimated. At a stage 210, an audio signal (e.g., a digital audio file and/or a microphone signal) may be selected for the one or more threshold locations. The audio signal selected may be different for each threshold location. At a stage 212, the acoustic alert may be triggered (e.g., by generating data representing a trigger signal) at an acoustic beam steering array (e.g., array 102 in FIG. 1) when a coordinate of the object coincides with a threshold location. At a stage 214, a beam of steered acoustic energy may be generated by (e.g., emitted by speakers of the array 102) the acoustic beam steering array (e.g., beam 104 from array 102 in FIG. 1) into the environment in a direction of propagation determined by the coordinate of the object (e.g., determined by data representing the coordinate or location of the object).

In flow 200 of FIG. 2A, data representing a location of the object and/or data representing a coordinate of the object in the environment external to the autonomous vehicle may be calculated by a planner system and/or a perception system (e.g., planner system 110 and/or perception system 140 in FIG. 1).

Figure 2B:
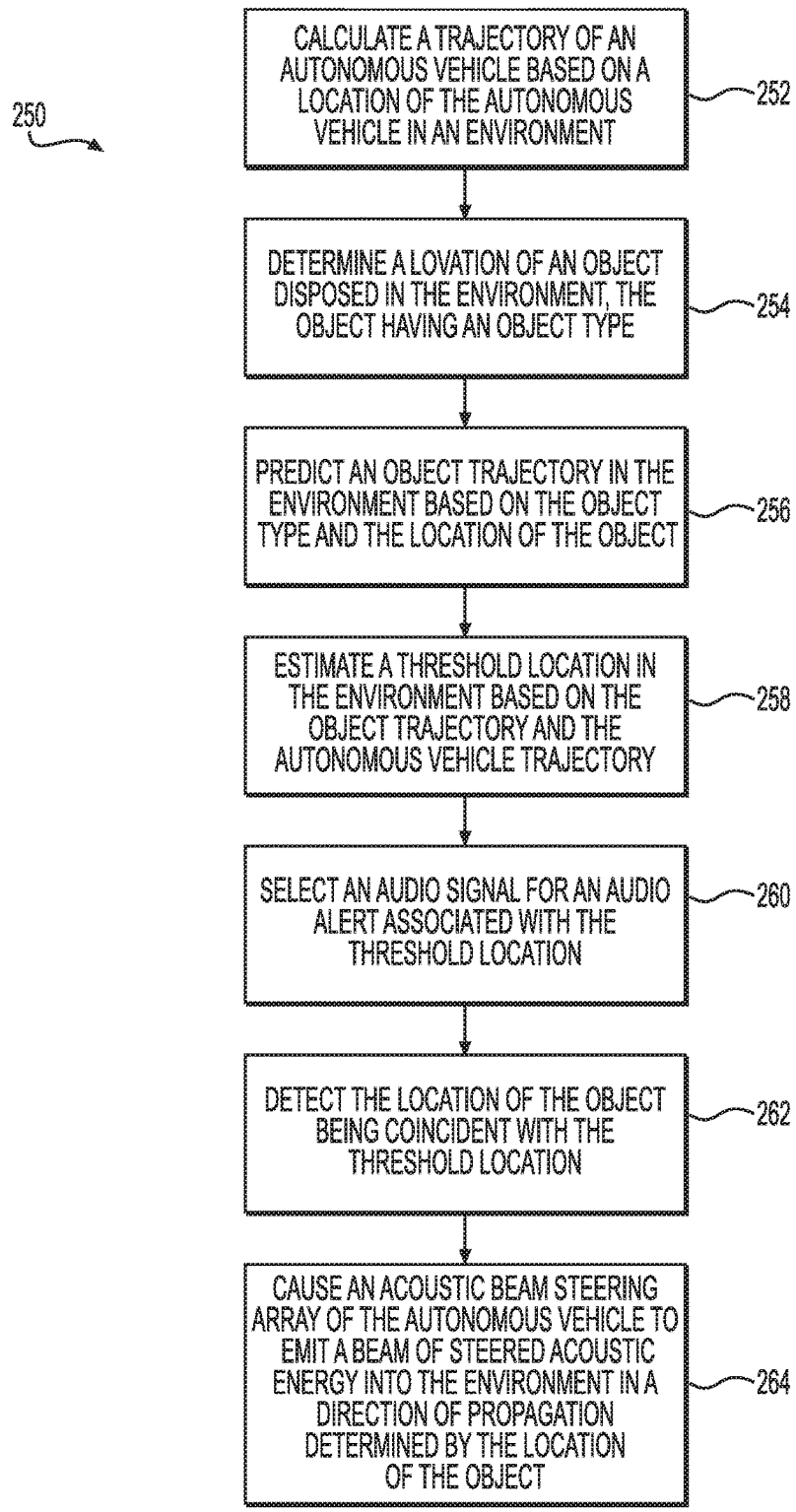
FIG. 2B depicts another example of a flow diagram for implementing acoustic beam steering in an autonomous vehicle.

FIG. 2B depicts another example of a flow diagram 250 for implementing acoustic beam steering in an autonomous vehicle. At a stage 252, data representing a trajectory of the autonomous vehicle 100 in the environment may be calculated based on data representing a location of the autonomous vehicle 100 (e.g., POSE data). At a stage 254, data representing a location (e.g., a coordinate) of an object disposed in the environment may be determined (e.g., based on object track data derived from the sensor data). Data representing an object type may be associated with the data representing the location of the object. At a stage 256, data representing an object trajectory in the environment may be predicted based on the data representing the object type and the data representing the location of the object in the environment. At a stage 258, data representing a threshold location in the environment associated with an acoustic alert (e.g., from array 102) may be estimated based on the data representing the object trajectory and the data representing the trajectory of the autonomous vehicle. At a stage 260, data representing an audio signal associated with the acoustic alert may be selected. At a stage 262, the location of the object being coincident with the threshold location may be detected. As one example, the object trajectory crossing the threshold location may be one indication of coincidence. At a stage 264, an acoustic beam steering array (e.g., array 102) may be caused (e.g., triggered, activated, or commanded) to emit a beam of steered acoustic energy (e.g., beam 104) in a direction of propagation (e.g., direction of propagation 106) determined by the location of the object (e.g., a coordinate of the object in the environment).

Stages of flow 200, flow 250, or both, may be implemented for one or more acoustic beam steering arrays 102. One or more stages of flow 200, flow 250, or both, may be repeated. For example, object trajectory, object location (e.g., object coordinates), threshold location, vehicle trajectory, vehicle location, audio signal selection, coincidence detection, and other stages may be repeated to update and/or process data as necessary (e.g., due to motion of the autonomous vehicle, the object, or both).

Figure 3A:
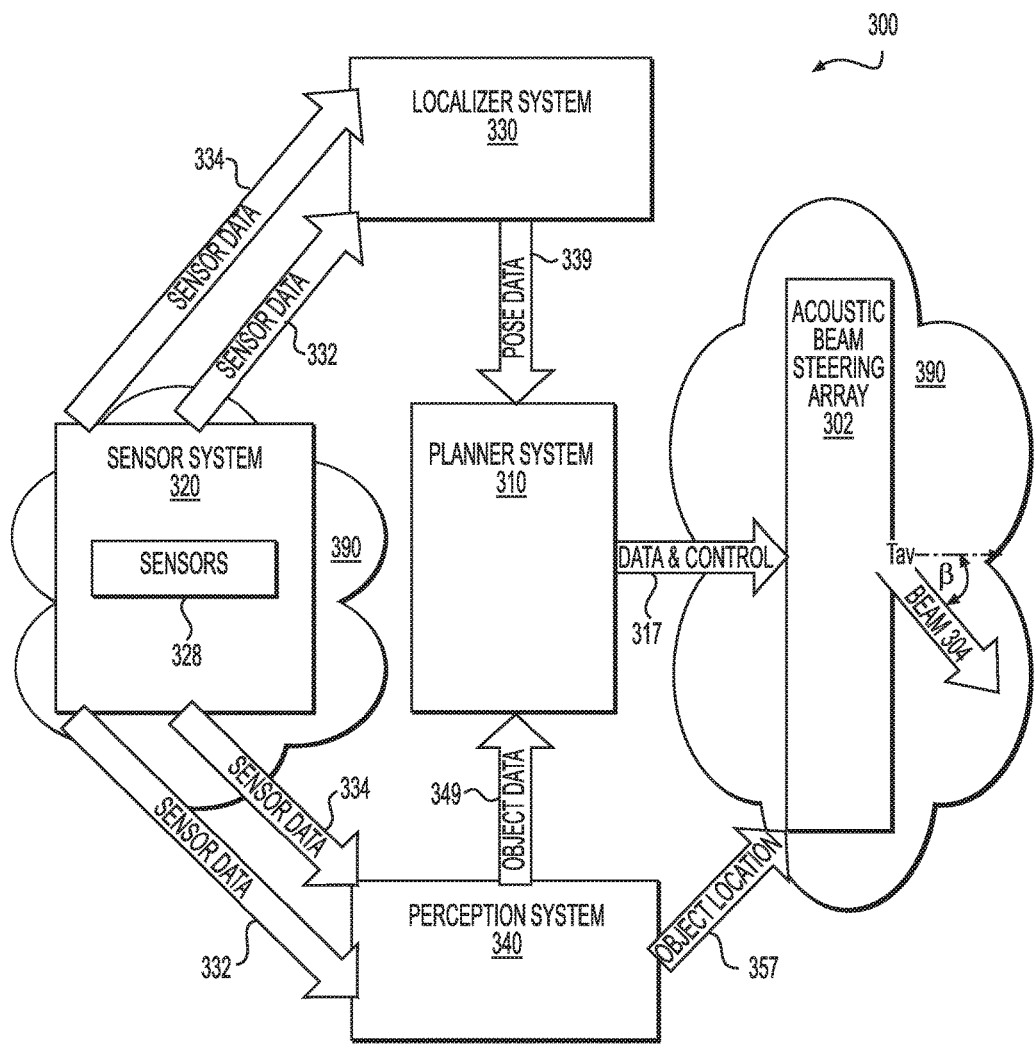
FIG. 3A depicts another example of a system for implementing an acoustic beam steering array in an autonomous vehicle.

FIG. 3A depicts another example 300 of a system for implementing an acoustic beam steering array in an autonomous vehicle. In FIG. 3A, sensor system 320 includes sensors 328 being configured to generate sensor data 332 and 334 (e.g., data representing a sensor signal) indicative of the environment 390 external to the autonomous vehicle (e.g., vehicle 100 of FIG. 1). Localizer system 330 may receive sensor data 332 and 334, and perception system 340 may receive sensor data 332 and 334. Sensor data 332 and 334 received by localizer system 330 need not be identical to the sensor data 332 and 334 received by the perception system 340. Planner system 310 may receive vehicle location data (e.g., POSE data) from the localizer system 330 and may receive object data (e.g., object classification, object track, and object location) from the perception system 340.

Planner system 310 may determine which detected objects (e.g., from a field of many potential objects in environment 390) to target for acoustic alerts and may generate data and control signals 317 (e.g., trigger signal, audio signal and object location) that are received by acoustic beam steering array 302 to generate the beam 304 of steered acoustic energy into the environment 390. Planner system 310 may control other systems of the autonomous vehicle including but not limited to steering, braking, propulsion, signaling (e.g., brake lights, turn signals, head lamps, etc.), and safety. Those other systems may be activated as necessary by the planner system 310 to mitigate any potential collision with or close pass by the object being targeted for the acoustic alert. In some examples, data representing the object location may be received at the acoustic beam steering array 102 from the perception system 340 as denoted by arrow 357 for object location. Perception system 340 may track the location of the object using data included in the sensor data 334 and output the data representing the object coordinates 357 (e.g., an angle, a polar coordinate, Cartesian coordinates, etc.). In other examples, the perception system 340 may output the data representing the object coordinates to planner system 310 (e.g., in the object data 349), to the array 102 (e.g., in the object location 357) or both.

Figure 3B:
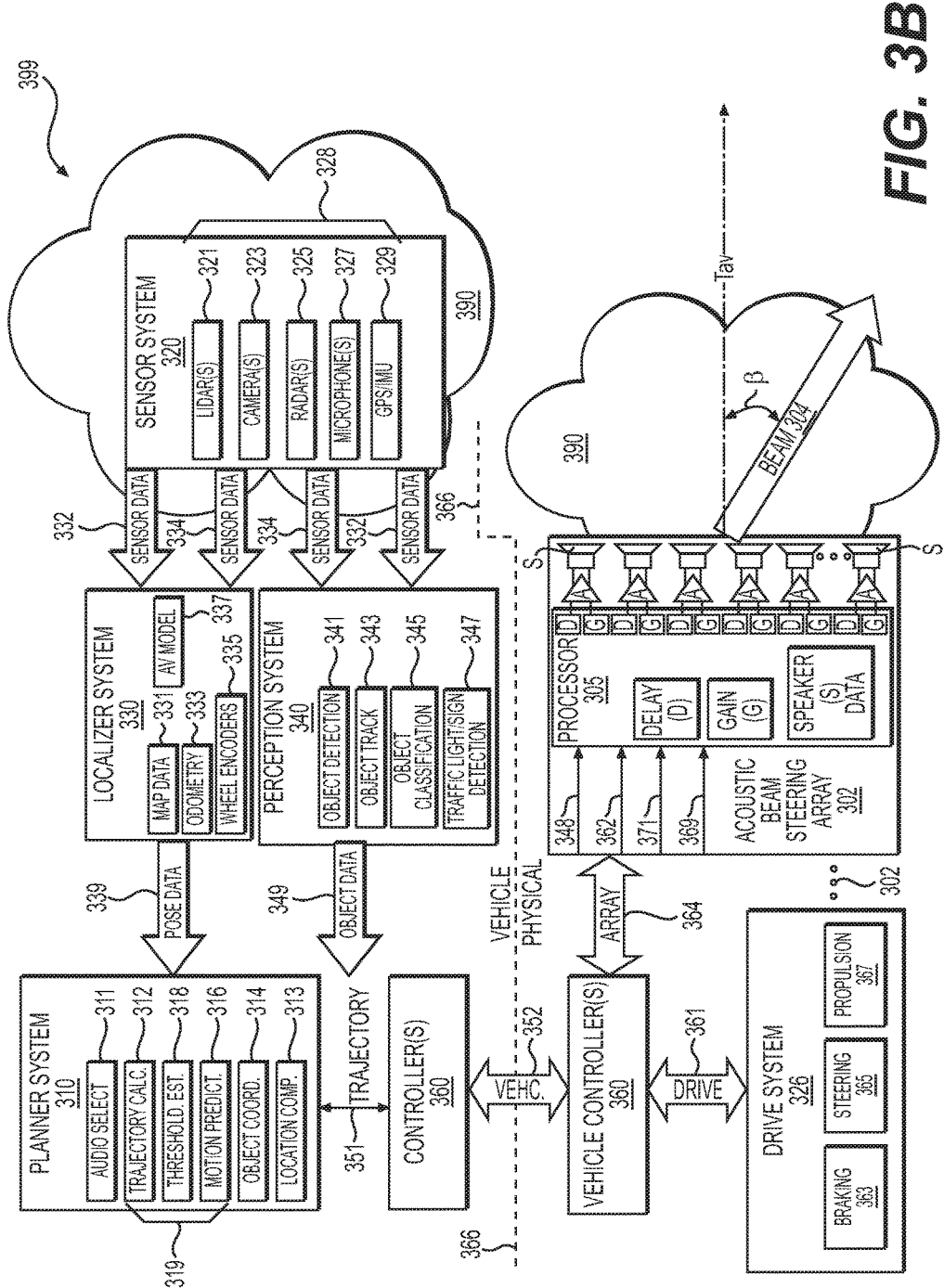
FIG. 3B depicts yet another example of a system for implementing an acoustic beam steering array in an autonomous vehicle.

FIG. 3B depicts yet another example 399 of a system for implementing an acoustic beam steering array in an autonomous vehicle. In example 399, sensors 328 in sensor system 320 may include but are not limited to one or more of: Light Detection and Ranging sensors 321 (LIDAR); image capture sensors 323 (e.g., Cameras); Radio Detection And Ranging sensors 325 (RADAR); sound capture sensors 327 (e.g., Microphones); and Global Positioning System sensors (GPS) and/or Inertial Measurement Unit sensors (IMU) 329, for example. Localizer system 330 and perception system 340 may receive sensor data 332 and 334, respectively, from one or more of the sensors 328. For example, perception system 340 may receive sensor data 334 relevant to determine information associated with objects in environment 390, such as sensor data from LIDAR 321, Cameras 323, RADAR 325, and Microphones 327; whereas, localizer system 330 may receive sensor data 332 associated with the location of the autonomous vehicle in environment 390, such as from GPS/IMU 329.

For example, localizer system 330 may receive and/or access data from sources other than sensor data 332, such as odometry data 333 from motion sensors to estimate change in position of the autonomous vehicle 100 over time, wheel encoders 335 to calculate motion, distance and other metrics of the autonomous vehicle 100 based on wheel rotations (e.g., by a propulsion system), map data 331 from data representing map tiles, Route Network Definition File (RNDF) and/or others, and data representing an autonomous vehicle (AV) model 337 that may be used to calculate vehicle location data based on models of vehicle dynamics (e.g., from simulations, captured data, etc.) of the autonomous vehicle 100. Localizer system 330 may use one or more of the data resources depicted to generate data representing POSE data 339.

As another example, perception system 340 may parse or otherwise analyze, process, or manipulate sensor data 334 to implement object detection 341, object track 343 (e.g., determining which detected objects are static (no motion) and which are dynamic (in motion)), object classification 345 (e.g., cars, motorcycle, bike, pedestrian, skate boarder, mailbox, buildings, street lights, etc.), and traffic light/sign detection 347 (e.g., stop lights, stop signs, rail road crossings, lane markers, cross-walks, etc.).

As yet another example, planner system 310 may receive the POSE data 339 and the object data 349 and may parse or otherwise analyze, process, or manipulate data (339, 349) to implement trajectory calculation 312, threshold location estimation 318, motion prediction 316, location comparison 313, object coordinate determination 314 and audio signal selection 311. Planner system 310 may communicate trajectory and control data 351 to a controller(s) 350. The controller(s) 350 may convert the trajectory and control data 351 to vehicle control and data 352. Vehicle control and data 352 may be communicated to a vehicle controller(s) 360. Vehicle controller(s) 360 may process the vehicle control and data 352 to generate array system data 364 and drive system data 361. Array system data 364 may include object location data 348 (e.g., a coordinate of the object in the environment 390), audio signal data 362, trigger signal data 371 and optionally, modulation signal data 369 that are received by the acoustic beam steering array 302. Although a single acoustic beam steering array 302 is depicted in FIG. 3B, the autonomous vehicle may include additional acoustic beam steering arrays as denoted by 303. Drive system data 361 may be communicated to a drive system 362. Drive system 362 may communicate the drive system data 361 to braking 363, steering 365 and propulsion 367 systems, respectively, of the autonomous vehicle 100. For example, drive system data 361 may include steering angle data for steering system 365 (e.g., a steering angle for a wheel), braking data for brake system 363 (e.g., brake force to be applied to a brake), and propulsion data (e.g., a voltage, current or power to be applied to a motor) for propulsion system 367. A dashed line 366 may represent a demarcation between a vehicle trajectory processing layer and a vehicle physical execution layer where data processed in the vehicle trajectory processing layer is implemented by the drive system and the array system, for example.

Acoustic beam steering array 302 may include a processor 305 (e.g., a microprocessor, a digital signal processor (DSP)) that may be configured to receive the data (348, 362, 371, 369) and processes the data to generate, using the array 302, the beam 304 of steered acoustic energy (e.g., at angle β relative to trajectory $T_{AV}$) into the environment 390 (e.g., in response to receiving the data representing the trigger signal 371). Acoustic beam steering array 302 may include several speakers S, with each speaker S in the array 302 being coupled with an output of amplifier A. Each amplifier A may include a gain input and a signal input. Processor 305 may calculate data representing a gain G for the gain input of each amplifier A and may calculate data representing a signal delay D for the signal input of each amplifier A. Processor 305 may access and/or or receive data representing information on speakers S (e.g., from an internal and/or external data source) and the information may include but is not limited to array width, speaker S spacing in the array, a wave front distance between adjacent speakers S in the array, number of speakers S in the array, speaker characteristics (e.g., frequency response, output level per watt of power, etc.), just to name a few.

Figure 4:
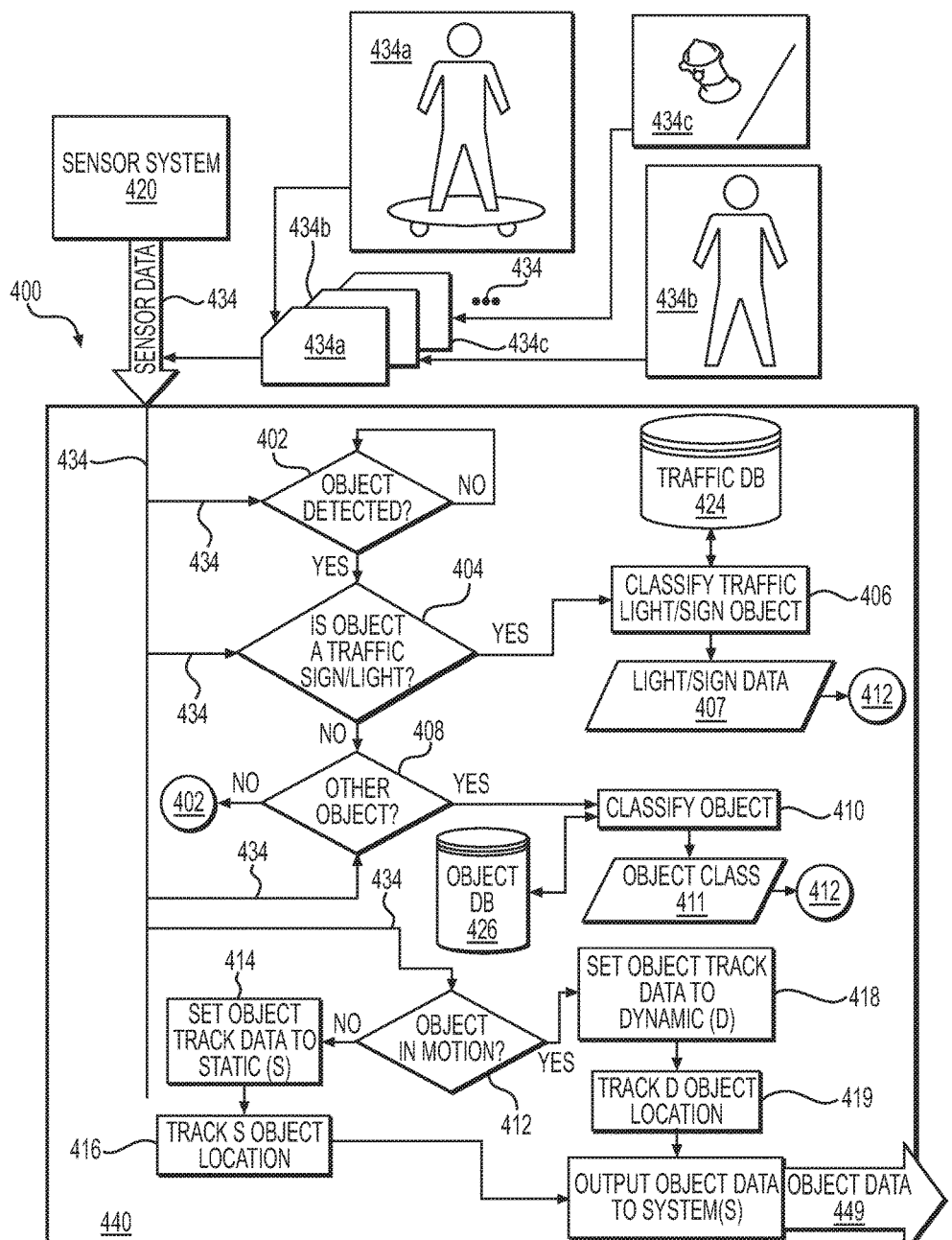
FIG. 4 depicts one example of a flow diagram for implementing a perception system.

FIG. 4 depicts one example of a flow diagram 400 for implementing a perception system. In FIG. 4, for purposes of explanation, sensor data 434 received at perception system 440 is depicted visually as sensor data 434a-434c (e.g., LIDAR data). At a stage 402 a determination may be made as to whether or not the sensor data 434 includes data representing a detected object. If a NO branch is taken, then flow 400 may return to the stage 402 to continue analysis of sensor data 434 for object detection. If a YES branch is taken, then flow 400 may continue to a stage 404 where a determination may be made as to whether or not the data representing the detected object includes data representing a traffic sign or light. If a YES branch is taken, then flow 400 may transition to a stage 406 where the data representing the detected object may be analyzed to classify the type of light/sign object detected, such as a traffic light (e.g., red, yellow, and green) or a stop sign, for example. Analysis at the stage 406 may include accessing a traffic object data store 424 where stored examples of data representing traffic classifications may be compared with the data representing the detected object to generate data representing a traffic classification 407. The stage 406 may then transition to another stage, such as a stage 412.

If a NO branch is taken, then flow 400 may transition to a stage 408 where the data representing the detected object may be analyzed to determine other object types to be classified. If a YES branch is taken from the stage 408, then flow 400 may transition to a stage 410 where the data representing the detected object may be analyzed to classify an object type for the detected object. An object data store 426 may be accessed to compare stored examples of data representing object classifications with the data representing the detected object to generate data representing an object classification 411. The stage 410 may then transition to another stage, such as a stage 412. If a NO branch is taken from the stage 408, then stage 408 may transition to another stage, such as back to the stage 402.

At the stage 412, object data classified at the stages 406 and/or 410 may be analyzed to determine if the sensor data 434 indicates motion associated with the data representing the detected object. If motion is not indicated, then a NO branch may be taken to a stage 414 where data representing an object track for the detected object may be set to static (S). At a stage 416, data representing a location of the object (e.g., the static object) may be tracked. For example, a stationary object detected at time t0 may move at a later time t1 and become a dynamic object. Moreover, the data representing the location of the object may be included in data received by the planner system 110. The planner system 110 may use the data representing the location of the object to determine a coordinate of the object (e.g., a coordinate relative to autonomous vehicle 100 and/or array 102).

On the other hand, if motion is indicated in the detected object, a YES branch may be taken from the stage 412 to a stage 418 where data representing an object track for the detected object may be set to dynamic (D). At a stage 420, data representing a location of the object (e.g., the dynamic object) may be tracked. The planner system 110 may analyze the data representing the object track and/or the data representing the location of the object to determine if a detected object (static or dynamic) may potentially have a conflicting location with respect to the autonomous vehicle and/or come into too close a proximity of the autonomous vehicle, such that the acoustic alert may be used to alter a behavior of the object and/or the person controlling the object.

At a stage 422, one or more of the data representing the object classification, the data representing the object track, and the data representing the location of the object may be included with the object data 449 (e.g., the object data received by the planner system). As one example, sensor data 434*a* may include data representing an object (e.g., a person riding a skateboard). Stage 402 may detect the object in the sensor data 434*a*. At the stage 404, it may be determined that the detected object is not a traffic sign/light. The stage 408 may determine that the detected object is of another object class and may analyze, at the stage 410, using data accessed from object data store 426, the data representing the object to determine the classification matches a person riding a skateboard and output the data representing the object classification 411. At the stage 412 a determination may be made that the detected object is in motion and at the stage 418 the object track may be set to dynamic (D) and the location of the object may be tracked at the stage 420 (e.g., by continuing to analyze the sensor data 434*a* for the detected object). At the stage 422, the object data associated with sensor data 434 may include the classification (e.g., a person riding a skateboard), the object track (e.g., the object is in motion), and the location of the object (e.g., the skateboarder's location) in the environment external to the autonomous vehicle, for example.

Similarly, for sensor data 434*b*, flow 400 may determine that the object classification is a pedestrian, the pedestrian is in motion (e.g., is walking) and has a dynamic object track, and may track the location of the object (e.g., the pedestrian) in the environment external to the autonomous vehicle), for example. Finally, for sensor data 434*c*, flow 400 may determine that the object classification is a fire hydrant, the fire hydrant is not moving and has a static object track, and may track the location of the fire hydrant. Note, that in some examples, the object data 449 associated with sensor data 434*a*, 434*b*, and 434*c* may be further processed by the planner system based on factors including but not limited to object track, object classification and location of the object. For example, in the case of the skateboarder and the pedestrian, the object data 449 may be used for one or more of trajectory calculation, threshold location estimation, motion prediction, location comparison, and object coordinates, in the event the planner system decides to implement an acoustic alert for the skateboarder and/or the pedestrian. However, the planner system may decide to ignore the object data for the fire hydrant due its static object track because the fire hydrant is not likely to be in motion (e.g., the fire hydrant is stationary) that will conflict with the autonomous vehicle and/or because the fire hydrant is non-animate (e.g., can't respond to or be aware of an acoustic alert), for example.

Figure 5:
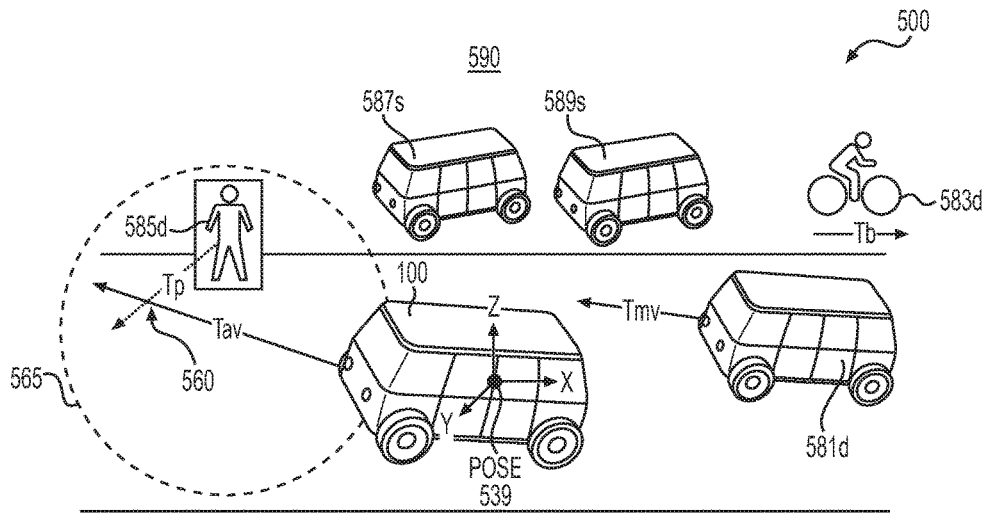
FIG. 5 depicts one example of object prioritization by a planner system in an autonomous vehicle.

FIG. 5 depicts one example 500 of object prioritization by a planner system in an autonomous vehicle. Example 500 depicts a visualization (e.g., based on LIDAR data or other sensor data) of an environment 590 external to the autonomous vehicle 100 as sensed by a sensor system of the autonomous vehicle 100 (e.g., sensor system 120, 320 of FIGS. 1 and 3A-3B). Object data from a perception system of the autonomous vehicle 100 has detected several objects in environment 590 including but not limited to an automobile 581*d*, a bicycle rider 583*d*, a walking pedestrian 585*d*, and two parked automobiles 587*s* and 589*s*. In this example, the perception system may have assigned dynamic object tracks to objects 581*d*, 583*d* and 585*d*, thus the label "d" is associated with the reference numerals for those objects. The perception system has also assigned static object tracks to objects 587*s* and 589*s*, thus the label "s" is associated with the reference numerals for those objects. The localizer system may determine the local pose data 539 (e.g., position and orientation estimation data) for the location of the autonomous vehicle 100 in environment 590. Furthermore, autonomous vehicle 100 may have a trajectory Tav as indicated by the arrow. The two parked automobiles 587*s* and 589*s* are static and have no indicated trajectory. Bicycle rider 583*d* has a trajectory Tb that is in a direction approximately opposite that of the trajectory Tav, and automobile 581*d* has a trajectory Tmv that is approximately parallel to and in the same direction as the trajectory Tav. Pedestrian 585*d* has a trajectory Tp that is predicted (e.g., by the planner system) to intersect the trajectory Tav of the vehicle 100.

The planner system may place a lower priority on processing data related to static objects 587*s* and 589*s* and dynamic object 583*d* because the static objects 587*s* and 589*s* are positioned out of the way of trajectory Tav (e.g., objects 587*s* and 589*s* are parked) and dynamic object 583*d* is moving in a direction away from the autonomous vehicle 100; thereby, reducing or eliminating a possibility that trajectory Tb may conflict with trajectory Tav. Motion and/or position of the pedestrian 585*d* in environment 590 or other objects in the environment 590 may be tracked or otherwise determined using metrics other than trajectory, including but not limited to object location, predicted object motion, object coordinates, predictive rate of motion relative to the location of the object, and a predicted next location of the object, for example. Motion and/or location of the pedestrian 585*d* in environment 590 or other objects in the environment 590 may be determined, at least in part, based on probabilities. The probabilities may be based on data representing object classification, object track, object location, and object type, for example.

However, the planner system may place a higher priority on tracking the location of pedestrian 585*d* due to its potentially conflicting trajectory Tp, and may place a slightly lower priority on tracking the location of automobile 581*d* because its trajectory Tmv is not presently conflicting with trajectory Tav, but it may conflict at a later time (e.g., due to a lane change or other vehicle maneuver). Therefore, based on example 500, pedestrian object 585*d* is the most likely candidate for an acoustic alert because its trajectory (e.g., based on its location and/or predicted motion) may result in a potential collision (e.g., at estimated location 560) with the autonomous vehicle 100 or result in an unsafe distance between the pedestrian object 585*d* and the autonomous vehicle 100.

Figure 6:
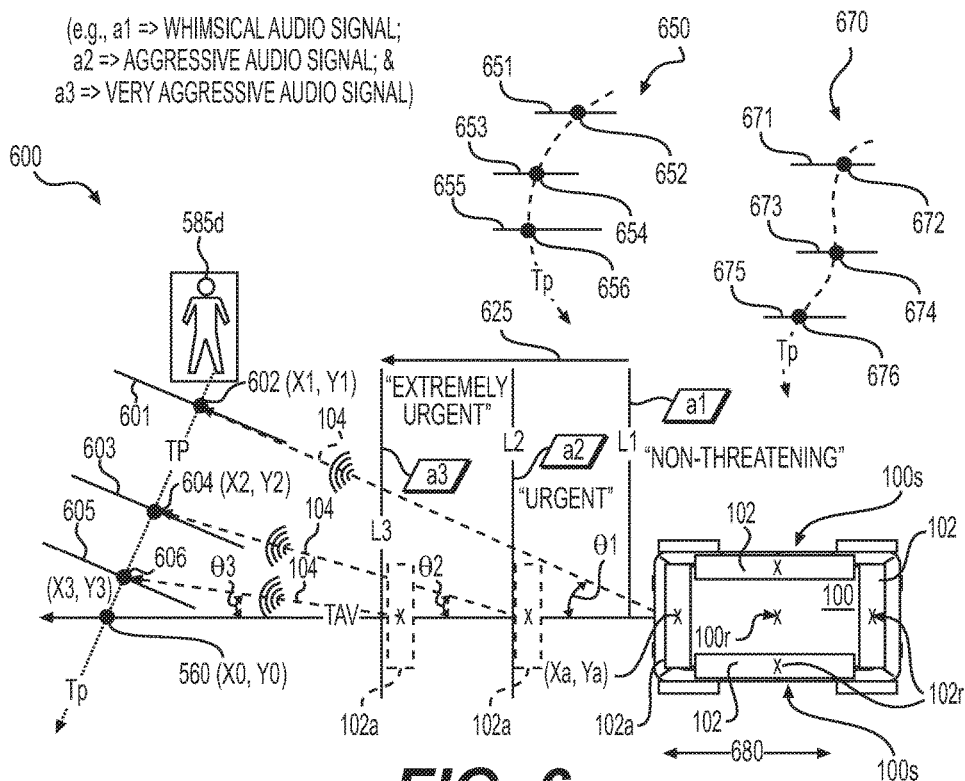
FIG. 6 depicts a top plan view of one example of acoustic beam steering from an acoustic beam steering array in an autonomous vehicle.

FIG. 6 depicts a top plan view of one example 600 of acoustic beam steering from an acoustic beam steering array in an autonomous vehicle. In FIG. 6, the example 500 of FIG. 5 is further illustrated in top plan view where trajectory Tav and Tp are estimated to cross (e.g., based on location data for the vehicle 100 and location data for the pedestrian object 585*d*) at an estimated location denoted as 560. Pedestrian object 585*d* is depicted in FIG. 6 as an example of a candidate most likely to receive an acoustic alert based on its predicted motion. The autonomous vehicle 100 is depicted as including four acoustic beam steering arrays 102 positioned at four different sides of the vehicle 100 (e.g., on four different portions of a roof). Autonomous vehicle 100 may be configured to travel bi-directionally as denoted by arrow 680, that is, autonomous vehicle 100 may not have a front (e.g., a hood) or a back (e.g., a trunk) as in a conventional automobile. Accordingly, more than one acoustic beam steering array 102 may be positioned on vehicle 100 to provide acoustic alert coverage in more than one direction of travel of the vehicle 100 and/or to provide acoustic alert coverage for objects that approach the vehicle 100 from its sides 100s.

The planner system may estimate one or more threshold locations in the environment 590, denoted as 601, 603 and 605, at which to communicate an acoustic alert when the location of the object (e.g., pedestrian object 585d) coincides with the threshold locations as denoted by points 602, 604 and 606 along trajectory Tp. Although three threshold locations are depicted, there may be more or fewer than depicted. As a first example, as the trajectory Tp crosses the first threshold location 601 at a point denoted as 602, planner system may determine the location of the pedestrian object 585d at the point 602 (e.g., having coordinates X1, Y1) and the location of the autonomous vehicle 100 (e.g., from POSE data) to calculate a coordinate (e.g., an angle) for the direction of propagation 106 of the beam of steered acoustic energy 104. For example, the coordinate may be based on a predetermined reference point 100r on the vehicle 100 and/or on another predetermined reference point 102r on the acoustic array 102a. As one example, if the predetermined reference point 102r has coordinates (Xa, Ya), a processor, circuitry, an algorithm or some combination of the foregoing may calculate the coordinate for the beam 104, such as an angle θ1 (e.g., based on trigonometric analysis) relative to vehicle trajectory Tav. As the autonomous vehicle 100 continues to travel 625 along trajectory Tav, from location L1 to location L2, the relative location between the pedestrian object 585d and the autonomous vehicle 100 may change, such that at the location L2, coordinates (X2, Y2) at point 604 of the second threshold location 603 may result in a new coordinate θ2 for the direction of propagation 106. Similarly, continued travel 625 along trajectory Tav, from location L2 to location L3, may change the relative location between the pedestrian object 585d and the autonomous vehicle 100, such that at the location L3, coordinates (X3, Y3) at point 606 of the third threshold location 605 may result in a new coordinate θ3 for the direction of propagation 106.

As the distance between the autonomous vehicle 100 pedestrian object 585d decreases, the data representing the audio signal selected for the steered beam 104 may be different to convey an increasing sense of urgency (e.g., an escalating threat level) to the pedestrian object 585d to change or halt its trajectory Tp, or otherwise modify his/her behavior to avoid a potential collision or close pass with the vehicle 100. As one example, the data representing the audio signal selected for threshold location 601, when the vehicle 100 may be at a relatively safe distance from the pedestrian object 585p, may be a whimsical audio signal a1 configured to gain the attention of the pedestrian object 585p in a non-threatening manner. As a second example, the data representing the audio signal selected for threshold location 603, when the vehicle 100 may be at a cautious distance from the pedestrian object 585p, may be a more aggressive audio signal a2 configured to gain the attention of the pedestrian object 585p in a more urgent manner. As a third example, the data representing the audio signal selected for threshold location 605, when the vehicle 100 may be at a potentially un-safe distance from the pedestrian object 585p, may be a very aggressive audio signal a3 configured to gain the attention of the pedestrian object 585p in an extremely urgent manner. Estimation of positions of the threshold locations in the environment 590 may be determined by the planner system to provide adequate time (e.g., approximately 5 seconds or more), based on a velocity of the autonomous vehicle, before the vehicle 100 arrives at a predicted impact point with the pedestrian object 585p (e.g., a point 560 in environment 590 where trajectories Tav and Tp are estimated to intersect each other).

In FIG. 6, trajectory Tp of the pedestrian object 585p need not be a straight line as depicted and the trajectory (e.g., the actual trajectory) may be an arcuate trajectory as depicted in example 650 or may be a non-linear trajectory as depicted in example 670. The planner system 110 may process object data from the perception system 140 and POSE data from the localizer system 130 to calculate the threshold location. The location, shape (e.g., linear, arcuate, non-linear), orientation (e.g., with respect to the autonomous vehicle and/or object) and other characteristics of the threshold location may be application dependent and is not limited to the examples depicted herein. For example, in FIG. 6, threshold locations may be aligned approximately perpendicular to the trajectory Tp of pedestrian object 585d; however, other configurations may be calculated and implemented by the planner system 110. As another example, threshold locations may be aligned at a non-perpendicular orientation (or other orientation) to the trajectory Tav of the autonomous vehicle 100 or to a trajectory of the object. Furthermore, the trajectory of the object may be analyzed by the planner system to determine the configuration of the threshold location(s).

Figure 7:
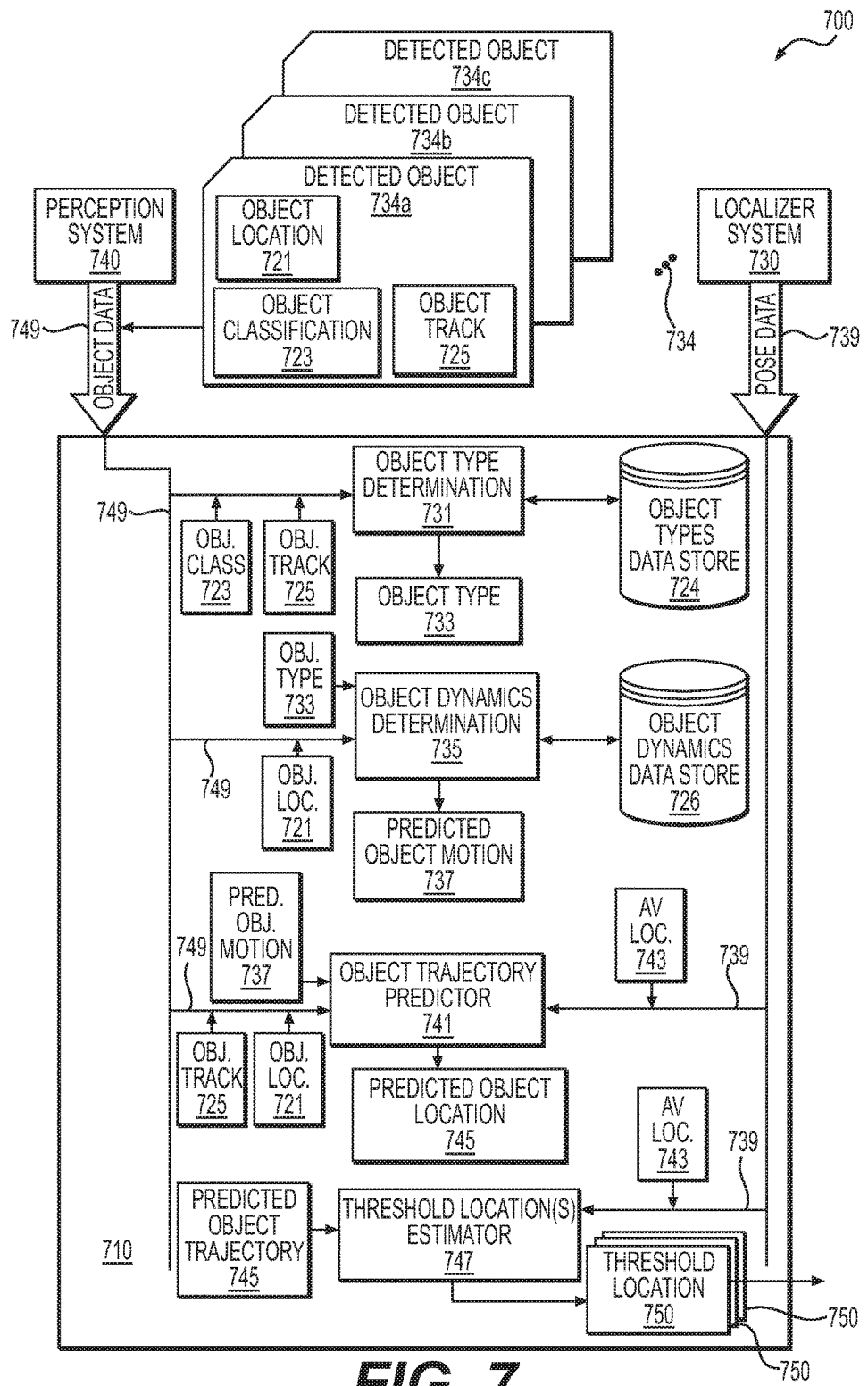
FIG. 7 depicts one example of a flow diagram for implementing a planner system.

FIG. 7 depicts one example of a flow diagram 700 for implementing a planner system. In FIG. 7, planner system 710 may be in communication with a perception system 740 from which it receives object data 749, and a localizer system 730 from which it receives POSE data 739. Object data 749 may include data associated with one or more detected objects. For example, object data 749 may include data associated with a large number of detected objects that are disposed in the environment external to the autonomous vehicle 100. However, some detected objects need not be tracked or may be assigned a lower priority based on the type of object. For example, fire hydrant object 434c in FIG. 4 may be a static object (e.g., fixed to the ground) and may not require processing for an acoustic alert; whereas, skateboarder object 434a may require processing for an acoustic alert due to it being a dynamic object and other factors, such as predicted human behavior of skateboard riders, a location of the skateboarder object 434a that may indicate the location and/or change in location may conflict with a trajectory of the autonomous vehicle 100, for example.

Object data 749 may include data for one or more detected objects. In FIG. 7, an example of three detected objects is denoted as 734a-734c. There may be object data 749 for more or fewer detected objects as denoted by 734. The object data for each detected object may include but is not limited to data representing: object location 721; object classification 723; and object track 725. Planner system 710 may be configured to implement object type determination 731. Object type determination 731 may be configured to receive the data representing object classification 723, the data representing the object track 725 and to access an object types data store 724. The object type determination 731 may be configured to compare the data representing the object classification 723 and the data representing the object track 725 with data representing object types (e.g., accessed from data store 724) to determine data representing an object type 733. Examples of data representing an object type 733 include but are not limited to a static grounded object type (e.g., the fire hydrant 434c of FIG. 4) and a dynamic pedestrian object (e.g., pedestrian object 585d of FIG. 5).

Object dynamics determination 735 may be configured to receive the data representing the object type 733 and the data representing the object location 721. Object dynamics determination 735 may be further configured to access an object dynamics data store 726 and to compare data representing object dynamics with the data representing the object type 733 and the data representing the object location 721 to determine data representing a predicted object motion 737.

Object trajectory predictor 741 may be configured to receive the data representing the predicted object motion 737, the data representing the location of the autonomous vehicle 743 (e.g., from POSE data 739), the data representing the object location 721 and the data representing the object track 725. The object trajectory predictor 741 may be configured to process the received data to generate data representing a predicted object trajectory 745 in the environment. In some examples, object trajectory predictor 741 may be configured to process the received data to generate data representing a predicted location of the object 745 in the environment.

Threshold location estimator 747 may be configured to receive the data representing the location of the autonomous vehicle 743 (e.g., from POSE data 739) and the data representing the predicted object trajectory 745 and generate data representing one or more threshold locations 750 in the environment at which acoustic alerts may be triggered. In some examples, the threshold location estimator 747 may be configured to receive the data representing the location of the autonomous vehicle 743 and the data representing the predicted location of the object 745 and generate the data representing the one or more threshold locations 750

Figure 8:
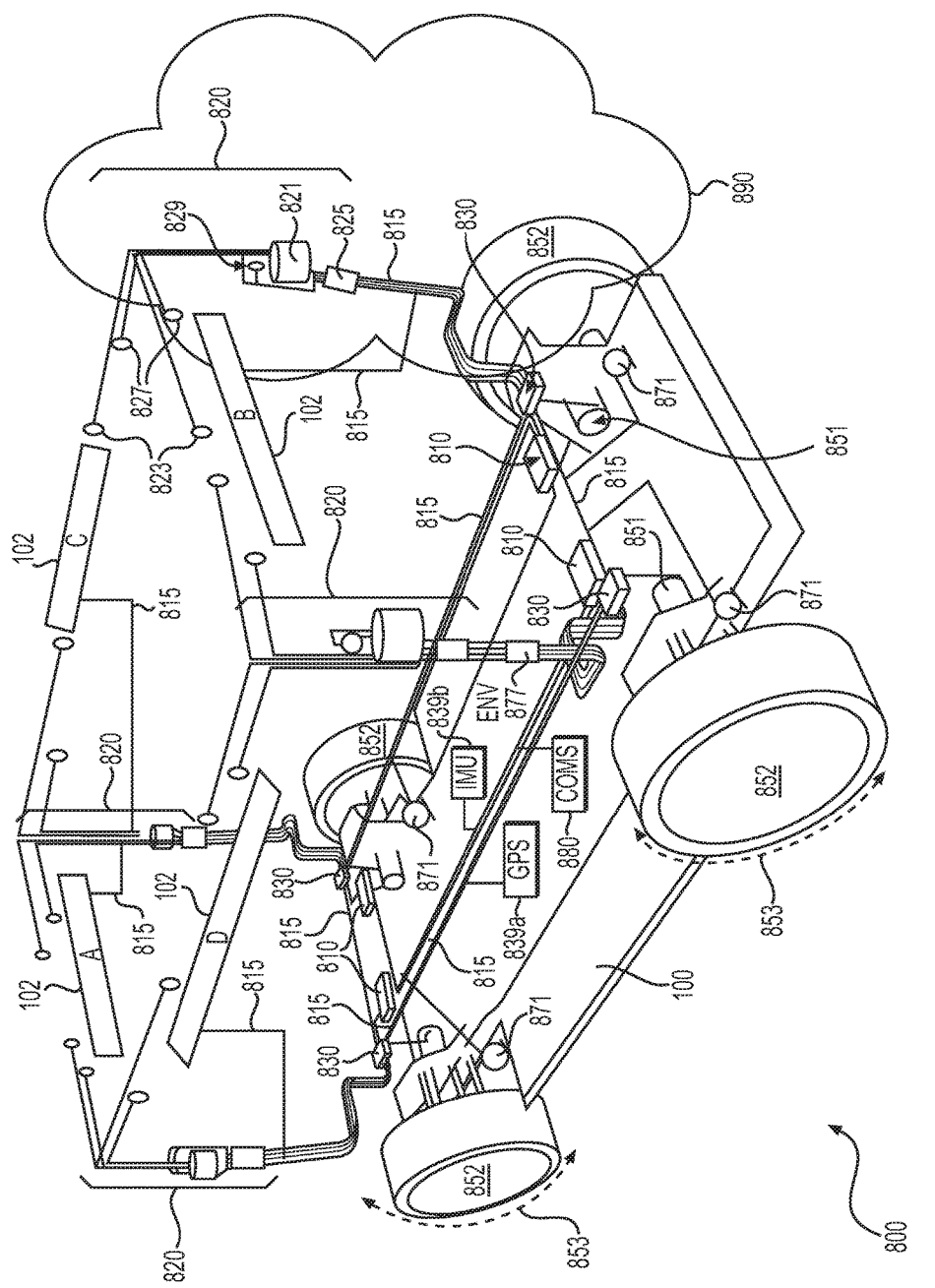
FIG. 8 depicts one example of a block diagram of systems in an autonomous vehicle having an acoustic beam steering array.

FIG. 8 depicts one example 800 of a block diagram of systems in an autonomous vehicle having an acoustic beam steering array. In FIG. 8, the autonomous vehicle 100 may include a suite of sensors 820 positioned at one or more locations on the autonomous vehicle 100. Each suite 820 may have sensors including but not limited to LIDAR 821 (e.g., color LIDAR, three-dimensional LIDAR, three-dimensional color LIDAR, two-dimensional LIDAR, etc.), an image capture device 823 (e.g., a digital camera), RADAR 825, a microphone 827 (e.g., to capture ambient sound), a microphone 871 (e.g., to capture sound from drive system components such as propulsion systems and/or braking systems), and a loudspeaker 829 (e.g., to greet/communicate with passengers of the AV 100). Loudspeaker 829 is not one of the speakers S in array 102. Each suite of sensors 820 may include more than one of the same types of sensor, such as two image capture devices 823, or microphone 871 positioned proximate each wheel 852, for example. Microphone 871 may be configured to capture real-time audio signals indicative of drive operations of the autonomous vehicle 100. Microphone 827 may be configured to capture real-time audio signals indicative of ambient sounds in the environment external to the autonomous vehicle 100. Autonomous vehicle 100 may include sensors for generating data representing a location of the autonomous vehicle 100, and those sensors may include but are not limited to a global positioning system (GPS) 839a, and an inertial measurement unit (IMU) 839b. Autonomous vehicle 100 may include one or more sensors ENV 877 for sensing environmental conditions in the environment external to the autonomous vehicle 100, such as air temperature, air pressure, humidity, barometric pressure, etc. Data generated by sensor(s) ENV 877 may be used to calculate the speed of sound in processing of data used by array(s) 102, such as wave front propagation times, for example.

A communications network 815 may route signals and/or data to/from sensors and other components and/or systems of the autonomous vehicle 100, such as one or more processors 810 and one or more routers 830, for example.

Routers 830 may route signals and/or data from: sensors in sensors suites 820; one or more acoustic beam steering arrays 102; between other routers 830; between processors 810; drive operation systems such as propulsion (e.g., electric motors 851), steering, braking, safety systems, etc.; and a communications system 880 (e.g., for wireless communication with external systems and/or external resources).

In FIG. 8, one or more microphones 827 may be configured to capture ambient sound in the environment 890 external to the autonomous vehicle 100. Signals and/or data from microphones 827 may be used to adjust gain values for one or more speakers (not shown) positioned in one or more of the acoustic beam steering arrays 102. As one example, loud ambient noise, such as noise emanating from a construction site may mask or otherwise impair audibility of the beam of steered acoustic energy 104 being emitted by an array 102. Accordingly, the gain may be increased or decreased base on ambient sound (e.g., in dB or other metric such as frequency content). The signals and/or data generated by microphones 827 may be converted from one signal format to another signal format, such as from analog-to-digital (e.g., using an ADC or a DSP) or from digital-to-analog (e.g., using a DAC or a DSP), for example.

Microphones 871 may be positioned in proximity of drive system components, such as electric motors 851, wheels 852, or brakes (not shown) to capture sound generated by those systems, such as rotational noise 853, regenerative braking noise, tire noise, and electric motor noise, for example. Signals and/or data generated by microphones 871 may be used as the data representing the audio signal, for example. The signals and/or data generated by microphones 871 may be converted from one signal format to another signal format, such as from analog-to-digital (e.g., using an ADC or a DSP) or from digital-to-analog (e.g., using a DAC or a DSP), for example. In other examples, signals and/or data generated by microphones 871 may be used to modulate the data representing the audio signal (e.g., using a DSP).

One or more processors 810 may be used to implement one or more of the planner system, the localizer system, the perception system, the drive system, a safety system and the acoustic beam steering array, for example. One or more processors 810 may be configured to execute algorithms embodied in a non-transitory computer readable medium, to implement one or more of the planner system, the localizer system, the perception system, the drive system, a safety system and the acoustic beam steering array, for example. The one or more processors 810 may include but are not limited to circuitry, logic, field programmable gate array (FPGA), application specific integrated circuits (ASIC), programmable logic, a digital signal processor (DSP), a graphics processing unit (GPU), a microprocessor, a microcontroller, a big fat computer (BFC) or others, or clusters thereof.

In FIG. 8, multiple acoustic beam steering arrays 102 may be positioned at multiple locations on the autonomous vehicle 100 to generate one or more acoustic alerts at one or more objects positioned at one or more locations in the environment 890. The acoustic beam steering arrays 102 need not be identical in configuration or dimensions. For example, the acoustic beam steering arrays 102 denoted as C and D may be longer in length and may include more speakers than acoustic beam steering arrays 102 denoted as A and B. As one example, the sides of the autonomous vehicle 100 where arrays C and D are located may be longer than the sides were arrays C and D are located; thereby, allowing for a longer length dimension for the array 102.

The longer length dimension may allow for a larger number of speakers in the array 102. An enclosure or other structure being configured to house the acoustic beam steering arrays 102 may be mounted on an exterior of the autonomous vehicle 100.

Figure 9:
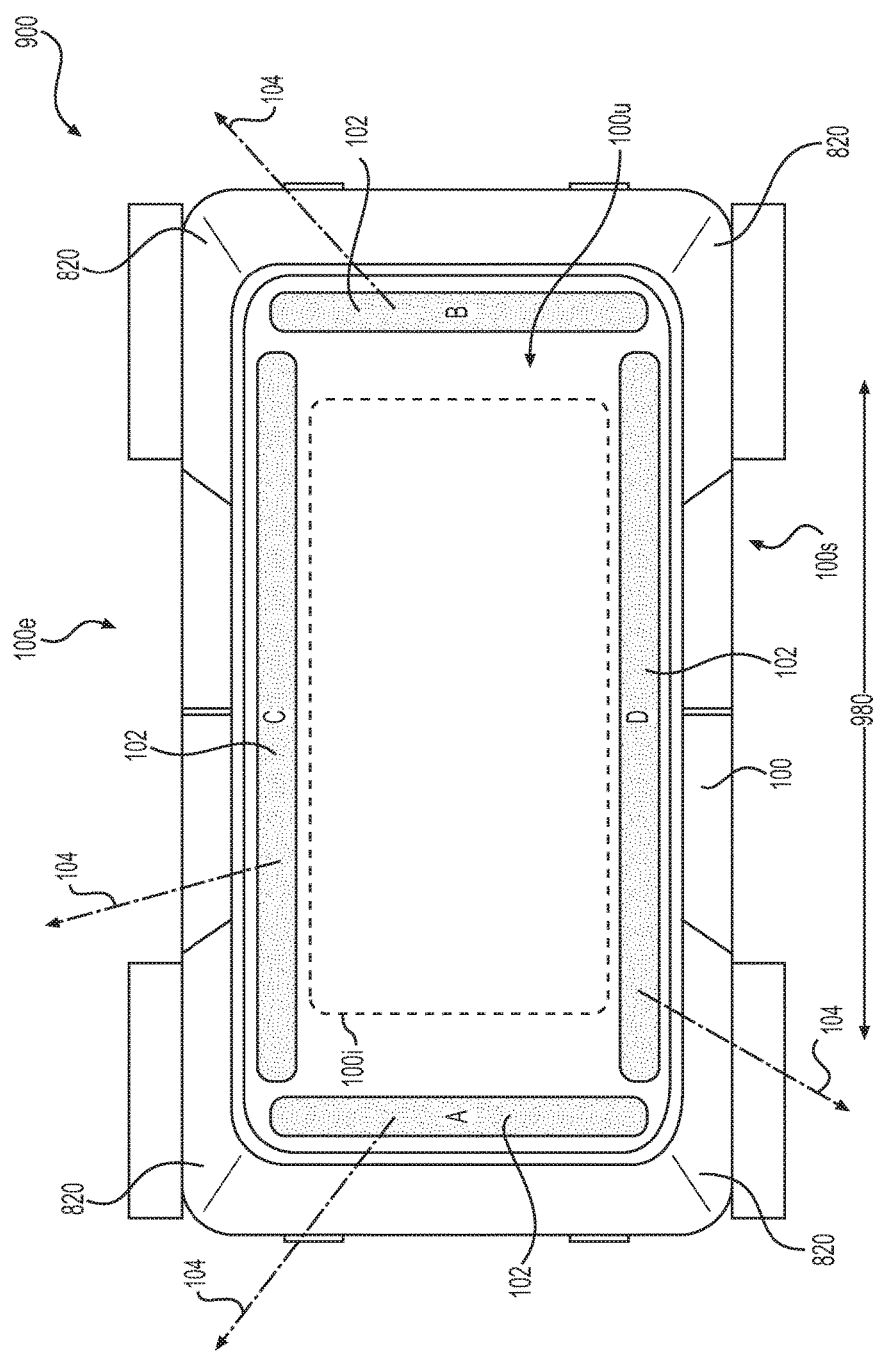
FIG. 9 depicts a top view of one example of an acoustic beam steering array positioning on an autonomous vehicle.

FIG. 9 depicts a top view of one example 900 of an acoustic beam steering array positioning on an autonomous vehicle. In FIG. 9, sensor suites 820 may be positioned at corner portions of the autonomous vehicle 100 (e.g., positioned at a pillar section) and enclosures for acoustic beam steering arrays 102 may be positioned on an upper surface 100u (e.g., on a roof) of the autonomous vehicle 100 and may be positioned to direct their respective beams 104 outward into the environment towards a location of an object targeted to receive an acoustic alert. Acoustic beam steering arrays 102 may be configured to provide coverage of steered acoustic energy at one or more objects disposed in the environment external to the autonomous vehicle 100 and the coverage may be in an arc of about 360 degrees around the autonomous vehicle 100, for example. As was described above in FIG. 8, the acoustic beam steering arrays 102 need not be the same size or have the same number of speakers. In FIG. 9, acoustic beam steering arrays 102 denoted as C and D have different dimensions than acoustic beam steering arrays 102 denoted as A and B. Sensor suites 820 may be positioned to provide sensor coverage of the environment external to the autonomous vehicle 100 for one array 102 or multiple arrays 102. In the case of multiple arrays 102, the sensor suites may provide overlapping regions of sensor coverage. A perception system of the autonomous vehicle 100 may receive sensor data from more than one sensor or suite of sensors to provide data for the planning system to implement triggering of one or more of the arrays 102 to generate an acoustic alert. The autonomous vehicle 100 may not have a front or a rear and therefore may be configured for driving operations in at least two different directions as denoted by arrow 980. Accordingly, the arrays 102 may not have a front or rear designation and depending on which direction the autonomous vehicle 100 is driving in, array 102 (A) may be the array facing the direction of travel or array 102 (B) may be the array facing the direction of travel.

Figure 10A:
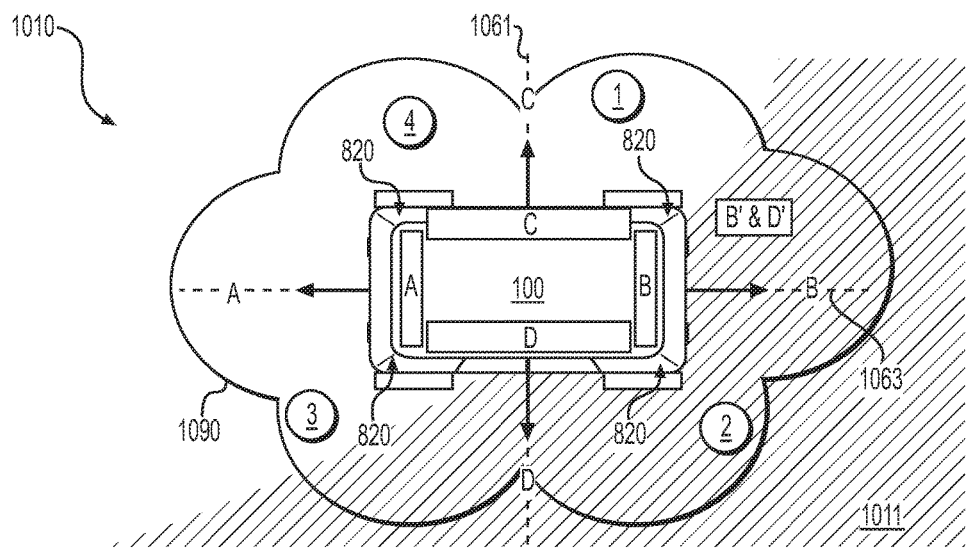
FIG. 10A depicts top plan views of two examples of sensor system coverage in an autonomous vehicle.
Figure 10A:
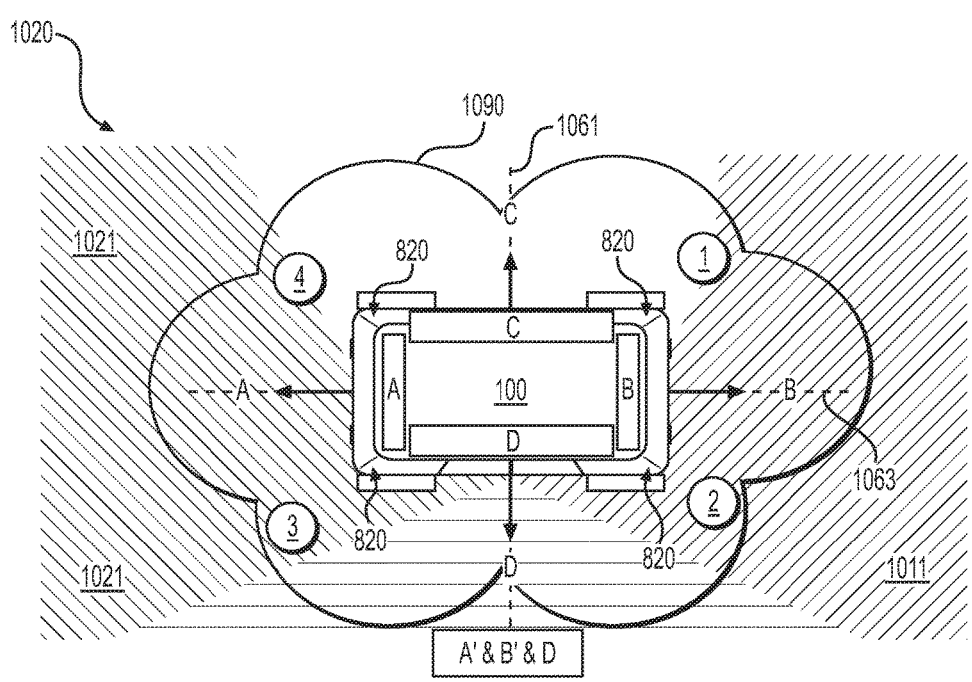
Figure 10B:
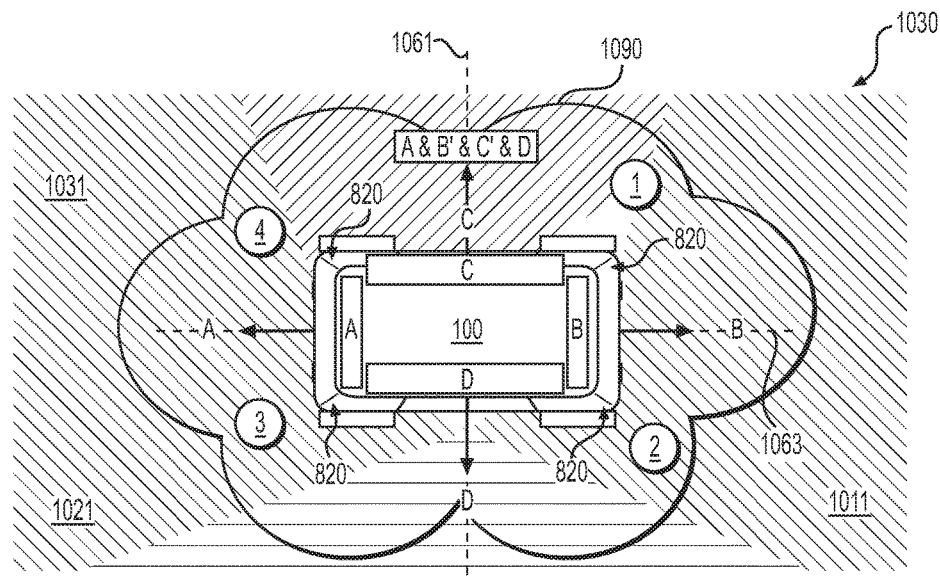
FIG. 10B depicts top plan views of another two examples of sensor system coverage in an autonomous vehicle.
Figure 10B:
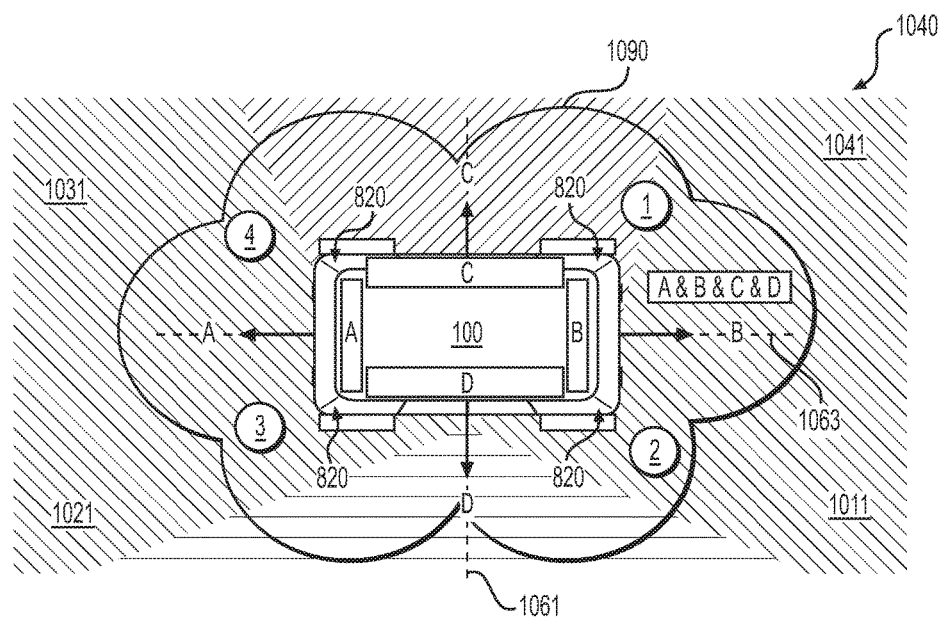

FIG. 10A depicts top plan views of two examples of sensor system coverage in an autonomous vehicle, and FIG. 10B depicts top plan views of another two examples of sensor system coverage in an autonomous vehicle. In example 1010 of FIG. 10A, one of the four sensor suites 820 (denoted in underline) may provide sensor coverage 1011, using one or more of its respective sensors, of the environment 1090 in a coverage region that may be configured to provide sensor data for acoustic beam steering arrays 102 (B and D). In example, 1010, sensor coverage 1011 for acoustic beam steering arrays 102 (B and D) may be partial coverage as denoted by B' and D', because there may be blind spots not covered by the single sensor suite 820.

In example 1020 of FIG. 10A, a second of the four sensor suites 820 may provide sensor coverage 1021 that overlaps with sensor coverage 1011, such that array D has full coverage and arrays A and B may have partial coverage as denoted by A' and B'. In example 1030 of FIG. 10B, a third of the four sensor suites 820 may provide sensor coverage 1031 that overlaps with sensor coverage 1011 and 1021, such that arrays A and D have full coverage and arrays C and B may have partial coverage as denoted by B' and C'. Finally, in example 1040 of FIG. 10B, a fourth of the four sensor suites 820 (e.g., all four sensor suites are on-line) may provide sensor coverage 1041 that overlaps with sensor coverage 1011, 1021 and 1031, such that arrays A, B, C and D have full coverage. The overlapping sensor fields of coverage may allow for redundancy if one or more sensor suites 820 and/or one or more of their respective sensors (e.g., LIDAR, Camera, RADAR, etc.) are damaged, malfunction, or are otherwise rendered inoperative. In FIGS. 10A-10B, dashed lines 1061 and 1063 demarcate four quadrants 1-4, and the sensor suites 820 may be symmetrical such that the sensors in the sensor suite 820 in quadrant 1 may be replicated in the sensor suites 820 in quadrants 2, 3 and 4, for example. Safety systems disposed in a quadrant (e.g., exterior systems, interior systems and drive systems) may also be replicated in other quadrants. For example, safety systems associated with quadrant 1 may be replicated in quadrants 2, 3 and 4. Sensor suites 820 in one or more of the quadrants may provide for overlapping sensor coverage as described above in examples 1010, 1020, 1030 and 1040 above.

One or more sensors in sensor suite 820 may be arranged in a corner cluster (e.g., to provide overlapping sensor coverage with other sensor suites 820) and one or more sensors in sensor suite 820 may be disposed at different vertical heights on the vehicle 100, such as one LIDAR sensor positioned vertically above another LIDAR sensor. In some examples, a sensor may include a combination of sensor types, such as a LIDAR including one or more cameras (e.g., each camera covering 160 degrees each for a total of 270 degrees of sensor coverage), and another LIDAR without cameras. Sensors in sensor suite 820 may include but are not limited to one or more of LIDAR sensors, image capture sensors (e.g., cameras), stereo cameras, long range stereo cameras, RADAR (e.g., a RADAR positioned at each end of the vehicle 100), and sound navigation and ranging (SONAR) sensors (e.g., for detecting small object low to the ground, to aid in parking the vehicle 100), for example. One or more sensors in sensor suite 820 may communicate with one or more processors of the autonomous vehicle 100. For example, sensor output signals and/or data from sensors in sensor suite 820 may be electrically communicated to multiple processing units to provide redundancy in signal/data processing. For example, each sensor in sensor suite 820 may have its output routed to two processors to provide for double redundancy, to three processors to provide for triple redundancy, or four processors to provide for quadruple redundancy. As one example, gigabit Ethernet may be used to communicate signals/data from one or more LIDAR sensors to multiple processors. As another example, high speed gigabit multimedia serial link (GMSL) may be used to communicate signals/data from one or more image capture sensors (e.g., camera, stereo camera) to multiple processors.

Figure 11:
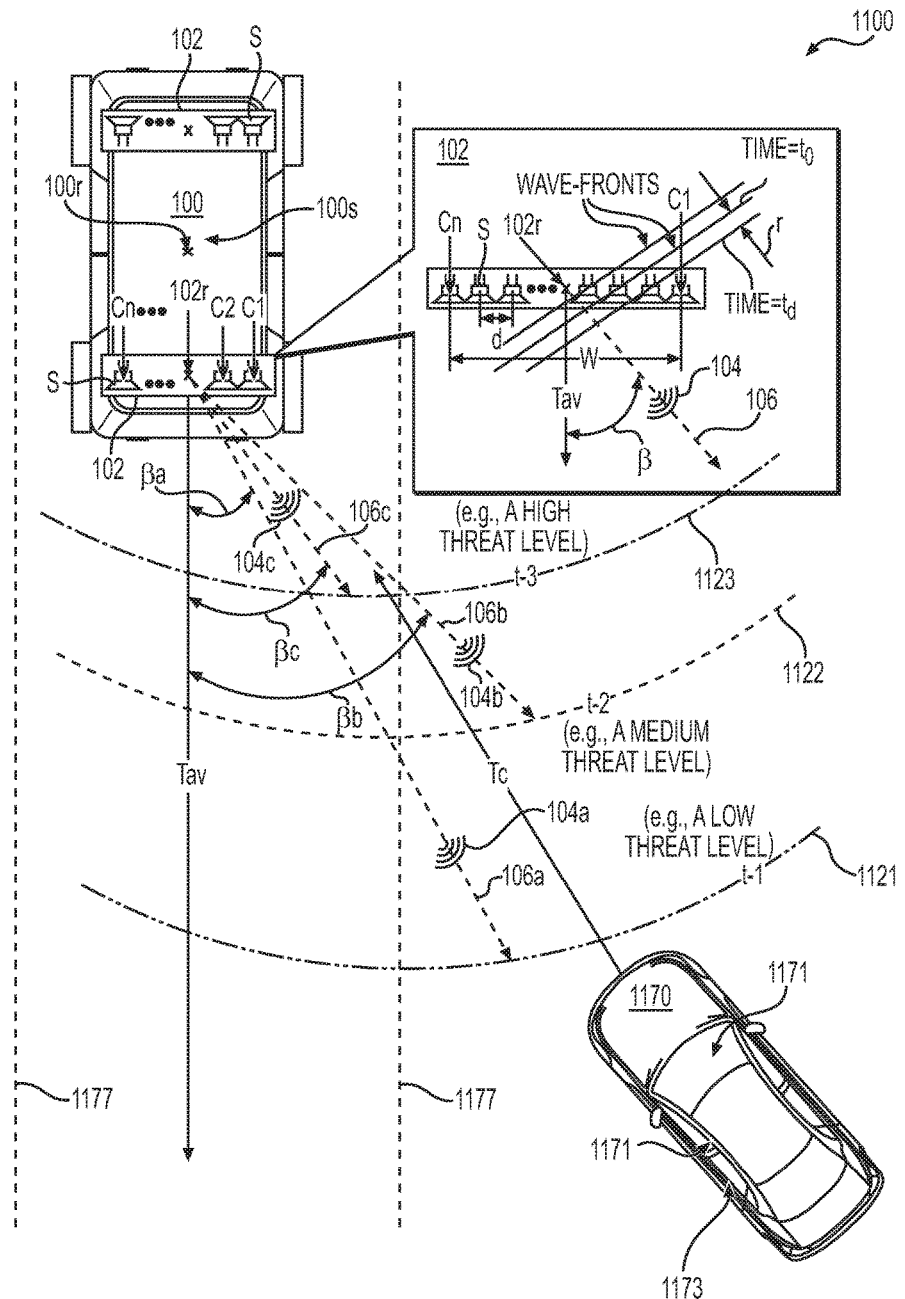
FIG. 11 depicts a top plan view of one example of an acoustic beam steering array of an autonomous vehicle steering acoustic energy at an approaching vehicle.

FIG. 11 depicts a top plan view of one example 1100 of an acoustic beam steering array of an autonomous vehicle steering acoustic energy at an approaching vehicle. In FIG. 11, autonomous vehicle 100 may have a trajectory Tav along a roadway between lane markers denoted by dashed lines 1177. A detected object in the environment external to the autonomous vehicle 100 has been classified as an automotive object type 1170 having a trajectory Tc that is estimated to conflict with trajectory Tav of the autonomous vehicle 100. Planner system may generate three threshold locations t-1, t-2, and t-3 having arcuate profiles 1121, 1122 and 1123, respectively. The three threshold locations t-1, t-2, and t-3 may be representative of different threat levels ranked from a low threat level at t-1 (e.g., a relatively safe distance away from vehicle 100), a middle threat level at t-2 (e.g., a distance that is cautiously close to the vehicle 100) and a high threat level at t-3 (e.g., a distance that is dangerously close to vehicle 100), for example. The audio signal for an acoustic alert to be generated at each of the three threshold locations t-1, t-2, and t-3 may be selected to audibly convey increasing levels of threat as the trajectory Tc of the object 1170 brings the object 1170 closer to the location of the autonomous vehicle 100 (e.g., a potential collision with autonomous vehicle 100).

When automotive object type 1170 crosses or otherwise has its location coincident with threshold location t-1, the planner system may generate a trigger signal to activate the acoustic array 102 positioned approximately in the direction of automotive object type 1170 to generate an acoustic alert using an audio signal 104a along a direction of propagation 106a based on a location (e.g., a coordinate) of the automotive object type 1170. For example, the location may be represented by a coordinate, an angle βa, measured between the trajectory Tav and the direction of propagation 106a. As the automotive object type 1170 continues on trajectory Tc and crosses threshold location t-2, another acoustic alert may be triggered by the planner system, using coordinate βb, audio signal 104b and direction of propagation 106b. Further travel along trajectory Tc by automotive object type 1170 that crosses threshold location t-3 may trigger yet another acoustic alert by planner system using coordinate βc, audio signal 104c and direction of propagation 106c.

For each of the acoustic alerts triggered by the planner system, the location of the automotive object type 1170 may change (e.g., relative to the location of the vehicle 100) and the planner system may receive updated object data (e.g., object tracking data from the perception system) to calculate (e.g., in real-time) changes in location of the automotive object type 1170 (e.g., to calculate coordinates for βa, βb and βc). The audio file selected by planner system for each threshold location t-1, t-2 and t-3 may be different and may be configured to include audible information intended to convey ever-increasing degrees of urgency at each of the threshold locations t-1 to t-2 and t-2 to t-3, for example. The audio signal(s) selected by the planner system may be configured, based on the object type data for 1170, to acoustically penetrate structures (1171, 1173) of the automobile, such as auto glass, car doors, etc., in order to garner the attention of a driver of the automobile. As one example, the selected audio signal may be configured to generate frequencies in a range from about 220 Hz to about 450 Hz to acoustically penetrate structures (1171, 1173) on the automobile 1170.

Acoustic beam steering array 102 may include several speakers and their associated amplifiers and driving electronics (e.g., a processor, a DSP, etc.). For purposes of explanation, each amplifier/speaker pair will be denoted as a channel, such that array 102 will include n-channels denoted as C1 for channel one all the way to Cn for the nth channel. In an enlarged view of the acoustic beam steering array 102, each speaker S may be spaced apart from an adjacent speaker by a distance d. Distance d (e.g., a spacing between adjacent speakers (S) may be the same for all speakers S in the array 102, such that all of the speakers S are spaced apart from one another by the distance d. In some examples, distance d may vary among the speakers S in the array 102 (e.g., distance d need not be identical between adjacent speakers in array 102). Distance d may be measured from a reference point on each speaker S, such as a center point of each speaker S.

A width W of the array 102 may be measured as a distance between the first speaker in the array 102 (e.g., channel C1) to the last speaker in the array 102 (e.g., channel Cn) and the width W may be measured from the center of the speaker in C1 to the center of the speaker in Cn, for example. A length of an enclosure that houses the speakers S may be determined in part by the width W between the first and last speakers in the array 102. In the direction of propagation 106 of the acoustic waves 104 generated by array 102, wave-fronts launched by adjacent speakers S in the array may be delayed in time, based on a time delay, by a wave-front propagation time $t_d$. The wave-front front propagation time $t_d$ may be calculated as a distance between adjacent wave-fronts r multiplied by the speed of sound C (e.g., $t_d=r*c$). In examples where the distance d between speakers S is the same for all speakers S in the array 102, the delay D calculated for each speaker S may be an increasing integer multiple of $t_d$. Therefore, for channel C1:($t_{d1}=(r*c)*1$), for channel C2: ($t_{d2}=(r*c)*2$), and for channel Cn: ($t_{dn}=(r*c)*n$), for example. In some examples, the speed of sound C may be calculated using data from a sensor (e.g., environmental sensor 877 of FIG. 8) to more accurately determine a value for the speed of sound C based on environmental conditions, such as altitude, air pressure, air temperature, humidity, and barometric pressure, for example.

Figure 12:
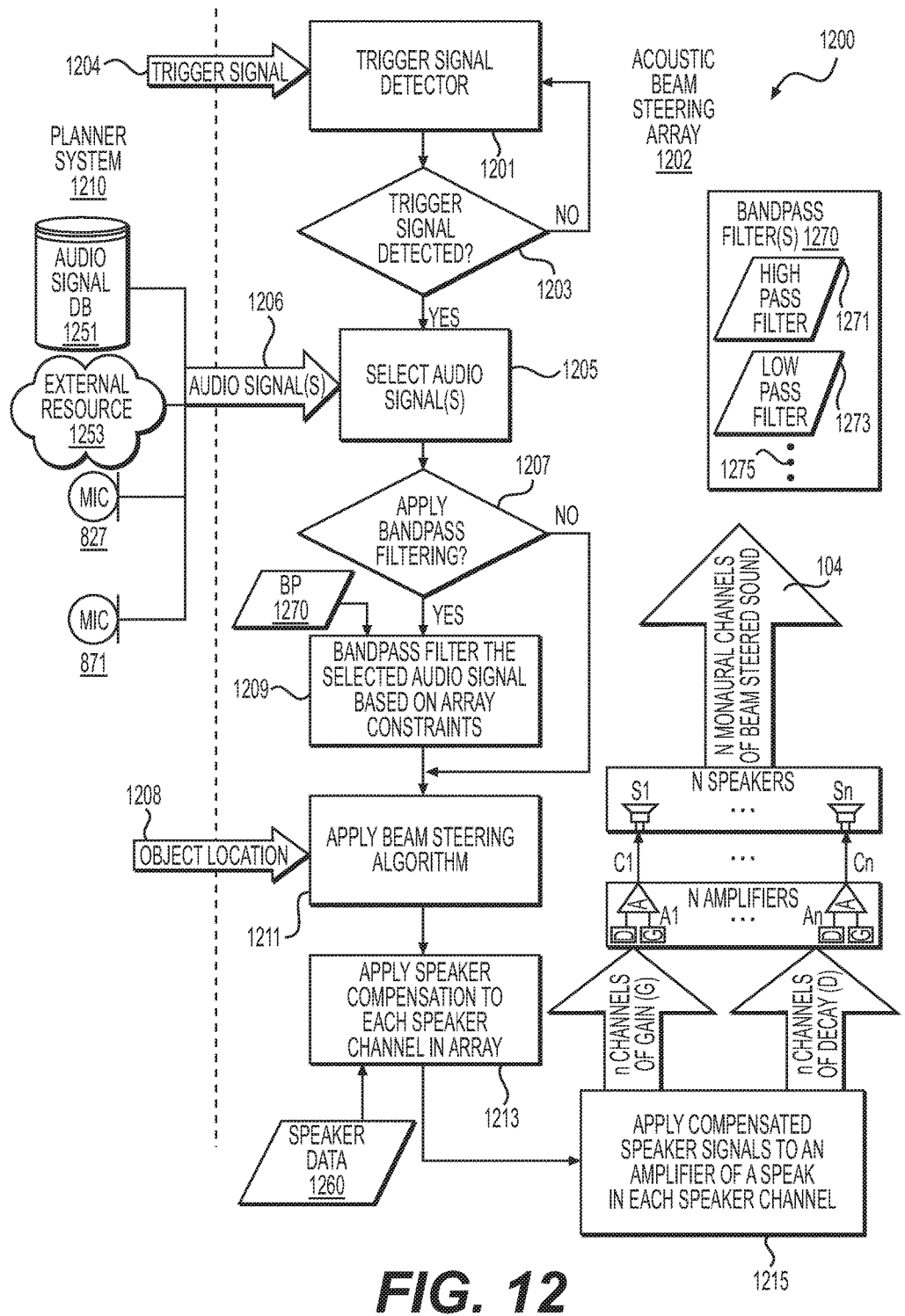
FIG. 12 depicts one example of a flow diagram for implementing acoustic beam steering in an acoustic beam steering array.

FIG. 12 depicts one example of a flow diagram 1200 for implementing acoustic beam steering in an acoustic beam steering array. In FIG. 12, planner system 1210 may communicate signals and/or data to an acoustic beam steering array 1202 configured to receive the signals and/or data and generate the steered beam of acoustic energy 104. At a stage 1201 a trigger signal detector may receive data representing the trigger signal 1204 and generate output data indicating the data representing the trigger signal 1204 has been received. At a stage 1203, a determination may be made as to whether the output data indicates the data representing the trigger signal 1204 (trigger signal hereinafter) has been received. If the output data is not indicative of the trigger signal being received, then a NO branch may be taken and flow 1200 may return to the stage 1201 to await arrival of the trigger signal. If the output data indicates the trigger signal has been received, then a YES branch may be taken and one or more audio signals 1206 selected by the planner system 1210 may be received by the array 1202. Planner system 1210 may select the data representing the audio signal from one or more resources including but not limited to an audio signal data store 1251 (e.g., one or more digital audio files), an external resource 1253 (e.g., the Cloud, the Internet, a data repository, etc.), a microphone 827 being configured to capture ambient sound (see FIG. 8), and a microphone 871 being configured to capture sound generated by driving operations (see FIG. 8).

At a stage 1207 a determination may be made as to whether or not to apply band pass filtering to the data representing the audio signal 1206. If a YES branch is taken, then at a stage 1209 one or more bandpass filters may be applied to the data representing the audio signal 1206 (e.g., in the analog domain using circuitry and/or in the digital domain using a DSP algorithm). The stage 1209 may access data representing bandpass filters 1270. The data representing bandpass filters 1270 may include but is not limited to data representing a high pass band filter 1271 and data representing a low pass band filter 1273. Other types of bandpass filters may be included in 1270 as denoted by 1275. If a NO branch is taken from the stage 1207, then flow 1200 may continue at a stage 1211 were a beam steering algorithm may receive the data representing the location of the object 1208 (e.g., an angle, at least two Cartesian coordinates, a polar coordinate, etc.).

At a stage 1213, speaker channel compensation may be applied to each speaker channel in the array. Speaker channel compensation at the stage 1213 may include calculating the gain G for each speaker channel and calculating the delay D for each speaker channel. Speaker channel compensation at the stage 1213 may include accessing speaker data 1260 for information related to each speaker S in the array, array width W, distance d between adjacent speakers in the array, stored data representing the distance r between adjacent speakers S in the direction of propagation, number of speakers S in the array, a size of the speakers S, and other speaker related information, for example.

At a stage 1215, compensated speaker signals may be applied to an amplifier A associated with each speaker S in each channel of the array. At the stage 1215, the signal gain G for each channel and the signal delay D for each channel may be applied to the gain inputs and signal inputs of each amplifier in each channel of the array, such that the amplifier A1 for the first channel C1 receives its respective compensated gain G and delay D signals, and so forth all the way to amplifier An for the nth channel Cn. With the amplifier in each channel driving its respective speaker, such that A1 drives S1 and An drives Sn. The speakers S1-Sn emit a beam of n monaural channels of steered acoustic energy 104 into the environment external to the autonomous vehicle 100.

Figure 13:
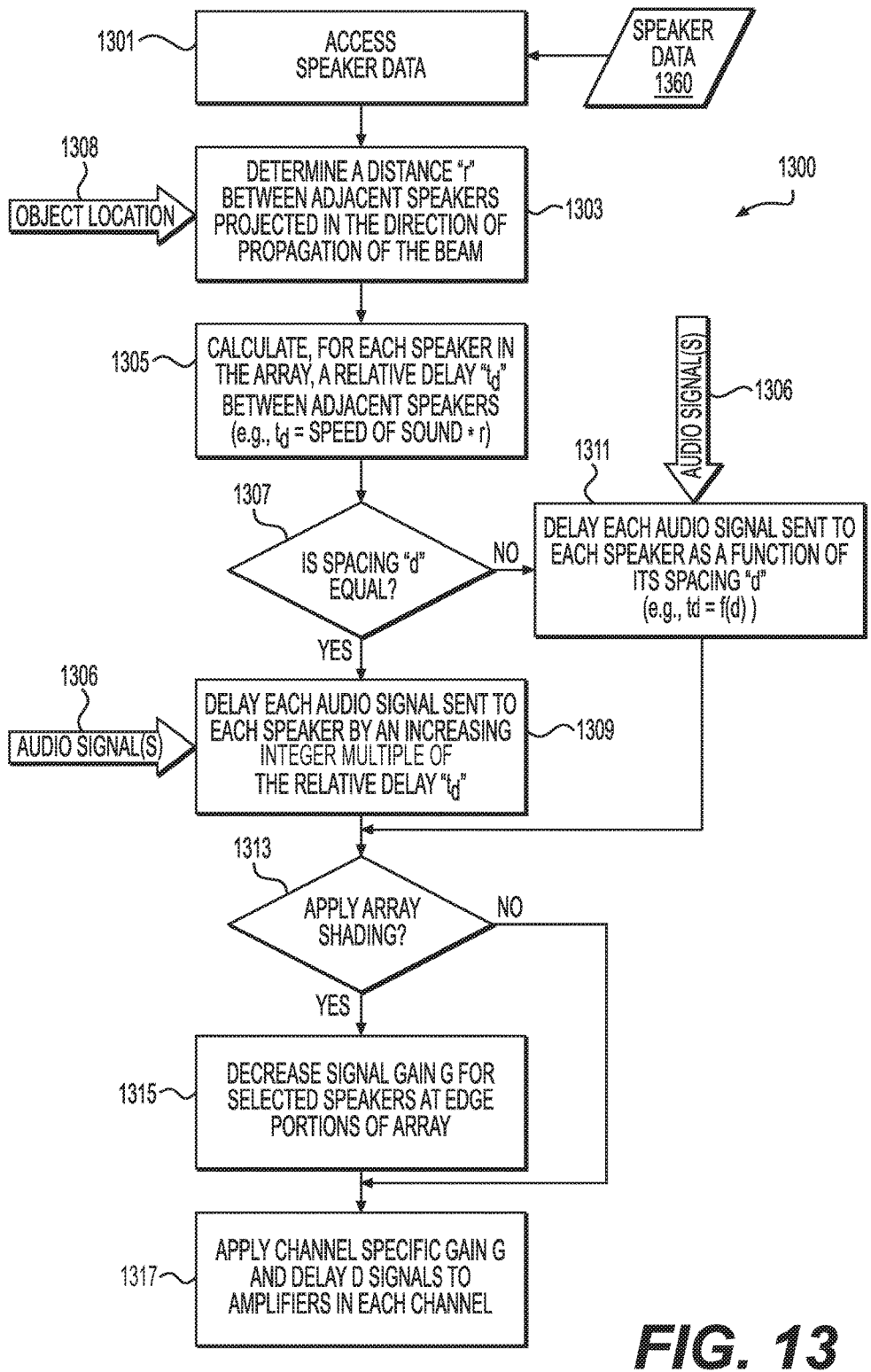
FIG. 13 depicts another example of a flow diagram for implementing acoustic beam steering in an acoustic beam steering array.

FIG. 13 depicts another example of a flow diagram 1300 for implementing acoustic beam steering in an acoustic beam steering array. At a stage 1301, data representing speaker data may be accessed from a data store 1360. One or more stages of flow 1300 may use data included in data store 1360. Examples of data representing speaker data includes but is not limited to the number of speakers in an array 102 (e.g., n in FIG. 11), the spacing between adjacent speakers in the array 102 (e.g., d in FIG. 11), a width of the array 102 (e.g., W in FIG. 11), speaker radiating area (e.g., an area of a speaker driver surface from which sound is generated), type of speaker (e.g., piezoelectric speaker, piezo ceramic speaker, etc.), speaker power handling capability (e.g., in watts), speaker drive type (e.g., voltage driven, current driven), for example. As one example, the speaker type may be piezoelectric, with a speaker drive type of voltage driven, the number of speakers may be 32 (e.g., n=32), the spacing between adjacent speaker may be 50 mm (e.g., d=50 mm), the width of the array 102 may be 163 cm (e.g., W=163 cm), and a speaker radiating area of 2600 mm$^2$. As another example, the speaker type may be piezo ceramic, with a speaker drive type of voltage driven, the number of speakers may be 330 (e.g., n=330), the spacing between adjacent speaker may be 2.5 mm (e.g., d=2.5 mm), the width of the array 102 may be 170 cm (e.g., W=170 cm), and a speaker radiating area of 25 mm$^2$.

At a stage 1303, the data representing the location of the object 1308 (e.g., an angle) and the data representing the speaker data 1360 (e.g., spacing d) may be used to determine a distance r between adjacent speakers in the array 102, projected in a direction of propagation of the beam (e.g., see d, r, S, 104 and 106 in FIG. 11). At the stage 1303, the data representing the location of the object 1308 may be used to determine the direction of propagation of the beam 104 (e.g., angle β relative to trajectory Tav in FIG. 12).

At a stage 1305, a relative delay $t_d$ between adjacent speakers in the array 102 may be calculated (e.g., speed of sound*r). The relative delay $t_d$ may represent a time delay to apply the data representing the audio signal to a signal input of an amplifier coupled with the speaker, such that from the first speaker (e.g., C1 in FIG. 11) to the last speaker (e.g., Cn in FIG. 11) in the array 102, the calculated value of the relative delay $t_d$ may incrementally increase for each speaker. For example, the relative delay $t_d$ for channel C2 is greater than the relative delay $t_d$ for channel C1, and so on.

At a stage 1307 a determination may be made as to whether or not the spacing between adjacent speakers (e.g., d in FIG. 11) is equal, based on speaker data 1360, for example. If the distance d is not equal, then a NO branch may be taken to a stage 1311. At the stage 1311, the audio signal (e.g., the data representing the audio signal 1306) sent to each speaker (e.g., via its respective amplifier) may be delayed as a function its distance d (e.g., $t_d$=f(d)). The stage 1311 may then transition to a stage 1313.

If the distance d is equal, then a YES branch may be taken to a stage 1309. At the stage 1309, the audio signal (e.g., the data representing the audio signal 1306) sent to each speaker (e.g., via its respective amplifier) may be delayed by an increasing integer multiple of the relative delay $t_d$ (e.g., as calculated at the stage 1305). The stage 1309 may then transition to the stage 1313.

At the stage 1313, a determination may be made as to whether or not to apply array shading to the data representing the signal gain (e.g., G) for one or more channels in the array 102. If a NO branch is taken, then flow 1300 may transition to a stage 1317. If a YES branch is taken, then flow 1300 may transition to a stage 1315. At the stage 1315, a signal gain G for selected speakers positioned at an edge portion of the array 102 may be decreased (e.g., relative to gains G for speakers positioned in a middle portion of the array 102), for example. As one example, data representing a first gain for a first portion of speakers positioned in a first portion (e.g., at a first edge of the array) of the acoustic beam steering array 102 may be calculated, data representing a second gain for a second portion of speakers positioned in a second portion (e.g., at a second edge of the array) of the acoustic beam steering array 102 may be calculated, and data representing a third gain for a third portion of speakers positioned in a third portion (e.g., at in a middle portion of the array) of the acoustic beam steering array 102 may be calculated. A magnitude of signal gain for the data representing the third gain may be greater than magnitudes of signal gain for the data representing the first gain and the data representing the second gain (e.g., third gain>first gain and third gain>second gain). The magnitudes of signal gain for the data representing the first gain and the data representing the second gain may be identical or may be different. In some examples, array shading may be implemented to reduce side lobes in the beam 104 of steered acoustic energy. Reducing side lobes may be effective in reducing or eliminating the audio signal from being audibly perceived by persons other than the intended object the beam 104 is being steered at (e.g., via the coordinate of the object). The stage 1315 may then transition to the stage 1317.

At the stage 1317, gains G and delays D specific to each channel in the array 102 may be applied to the signal and gain inputs of the amplifiers in each channel. For example, in channel C1, the data representing the gain G that was calculated for channel C1, may be applied to a gain input of the amplifier in channel C1 (e.g., as a voltage). The data representing the audio signal may be applied to the signal input of the amplifier in channel C1 with a time delay D (e.g., a time delay in milliseconds) determined by the data representing the signal delay that was calculated for channel C1.

Figure 14:
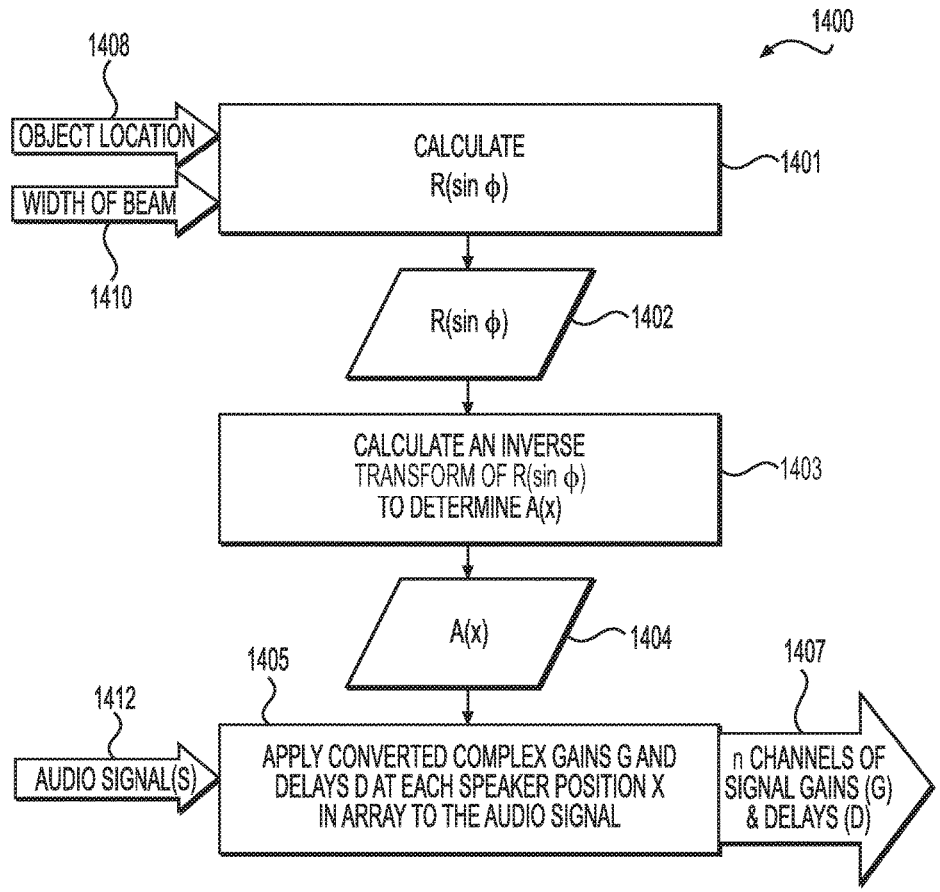
FIG. 14 depicts one example of a flow diagram for implementing adaptive acoustic beam steering in an acoustic beam steering array of an autonomous vehicle.

FIG. 14 depicts one example of a flow diagram 1400 for implementing adaptive acoustic beam steering in an acoustic beam steering array of an autonomous vehicle. Adaptive beam steering may be calculated using an equation depicted in example 1450 of FIG. 14, where a gain R may be determined as a function of an angle φ of the beam to be steered at the object (e.g., the object coordinates expressed as an angle.). Therefore, R may represent gain as a function of various values of the angle φ.

In example 1450, variable k represents a wave number which may be expressed as $k=2*(\pi/\lambda)$, where variable λ is the wavelength of the sound wave (e.g., the wavelength of beam 104). Variable φ is the angle to steer the beam 104 at (e.g., the data representing the coordinates of the object). Variable x represents a position of a speaker in the array 102, such that for an array of 320 speakers, x may have a value ranging from x=1 for the first speaker in the array 102 to x=320 for the last speaker in the array 102. Variable A represents a complex amplitude for the speaker at position x in the array 102. Variable d represents a distance (e.g., distance d in FIG. 11) between adjacent speakers in array 102. Variable L represents a width of the beam 104.

In flow 1400, at a stage 1401, data representing the location of the object 1408 (e.g., a coordinate angle φ) and data representing a width of the beam (e.g., variable L) may be received and may be used to calculate gain R as a function of the sine of the angle φ (e.g., R(sin φ) according to the equation of example 1450. The stage 1401 may output data representing the gain 1402 (e.g., a value for R (sin φ).

At a stage 1403, an inverse transform of R (sin φ) may be calculated to determine the complex amplitude A for each speaker position x in array 102 (e.g., A(x)). As one example, an inverse Fourier transform may be used to implement the inverse transform of R (sin φ). The stage 1403 may output data representing the complex amplitude 1404 (e.g., A(x)) for each speaker position x in array 102. For example, if there are 54 speakers in array 102, then stage 1403 may compute and output values for each of the 54 speaker positions.

At a stage 1405, the data representing the complex amplitude 1404 and the data representing the audio signal 1412 may be received and the complex gain G at each speaker position x may be applied to the gain input of the amplifier for the speaker at position x (e.g., at the channel for position x in the array 102), and the delay D at each speaker position x may be applied to the audio signal and the delayed audio signal may be applied to the signal input of the amplifier for the speaker at position x. The stage 1405 may output 1407 data representing n channels of signal gains G and n channels of signal delays D.

Figure 15:
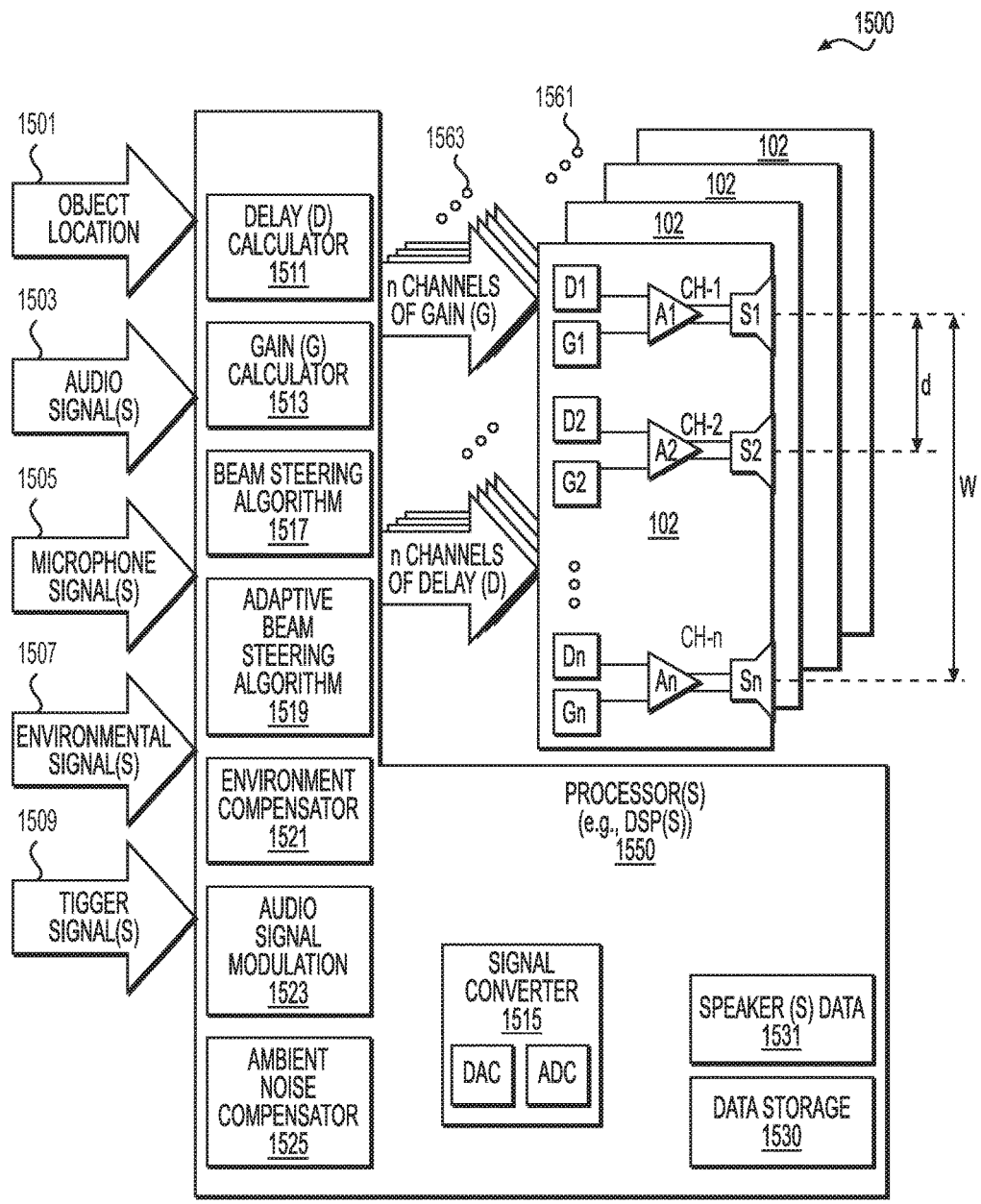
FIG. 15 depicts one example of a block diagram of an acoustic beam steering array.

FIG. 15 depicts one example of a block diagram 1500 of an acoustic beam steering array. In FIG. 15, a processor 1550 may receive data including but not limited to data representing: location of the object 1501 (e.g., coordinates); audio signals 1503; microphone signals 1505; environmental signals 1507 (e.g., from sensor ENV 877 in FIG. 8); and trigger signals 1509. In some examples, processor 1550 may be electrically coupled with an acoustic beam steering array 102, such that each acoustic beam steering array 102 is electrically coupled with its own dedicated processor 1550. In other examples, processor 1550 may be electrically coupled with multiple acoustic beam steering arrays 102.

Processor 1550 may implement functions to operate one or more acoustic beam steering arrays 102, and the functions implemented may include but are not limited to: a delay (D) calculator 1511; a gain (G) calculator 1513; a beam steering algorithm 1517 (e.g., flow 1300 of FIG. 13); an adaptive beam steering algorithm 1519 (e.g., flow 1400 of FIG. 14); an environment compensator 1521; an audio signal modulator 1523; an ambient noise compensator 1525; and a signal converter 1515. Processor 1550 may access data including but not limited to speaker (S) data 1531 (e.g., spacing d, width W, number of speaker S, speaker compensation data for calculating gain G and delay D, etc.), and data storage 1530 (e.g. for storing data, algorithms, etc.). Processor 1550 may be implemented in algorithms, software, firmware, logic, circuitry or some combination of the foregoing.

Data and signals received by the processor 1550 may be converted from one format to another format using signal converter 1515. For example, signal converter 1515 may convert digital data to an analog signal using a digital-to-analog converter (DAC) and may convert an analog signal to digital data using an analog-to-digital converter (ADC). Processing of the data representing the audio signal(s) 1503, the data representing the microphone signal(s) 1505, and the data representing the environmental signal(s) 1507 may be handled in the analog domain using the DAC, the digital domain using ADC, or both.

Environment compensator 1521 may process the data representing the environmental signal(s) and output data representing compensated environment data, such as the speed of sound c (e.g., compensated for temperature, altitude, etc.) for use by the beam steering algorithms (1517, 1519).

Ambient noise compensator 1525 may receive data representing ambient noise (e.g., from microphone 827 in FIG. 8) and process the data to output data representing gain compensation. The data representing the gain compensation may be indicative of ambient noise levels in the environment external to the autonomous vehicle 100. High levels of ambient noise may require gain levels G applied to the amplifiers A in one or more channels to be increased to compensate for the high levels of ambient noise. The gain calculator 1513 may receive the data representing gain compensation and may increase gain G or decrease gain G in one or more of the channels of an array 102.

Audio signal modulation 1523 may receive the data representing the audio signal and data representing a modulation signal (e.g., from microphone 871 in FIG. 8 or from another audio signal) and modulate the data representing the audio signal using the data representing the modulation signal. For example, the data representing the modulation signal may be based on regenerative braking noise generated by a drive system of the autonomous vehicle 100. A signal from microphone 871 in FIG. 8 may be the signal source for the data representing the modulation signal, and an amplitude of the data representing the modulation signal may be used to modulate the data representing the audio signal (e.g., from a digital audio file). Audio signal modulation 1523 may process the data representing the audio signal and data representing the modulation signal in the analog domain (e.g., using DAC in signal converter 1515) or the digital domain (e.g., using ADC in signal converter 1515).

Gain calculator 1513 and delay calculator 1511 may calculate channel gains G and channel delays D for one or more arrays 102 using algorithms specific to the type of beam steering algorithm being implemented for an array, such as for beam steering algorithm 1517 or adaptive beam steering algorithm 1519, for example. Processor(s) 1550 may receive data representing trigger signals 1509 and generate n channels of gain G 1563 and n channels of delay D 1565 for each array 102 that is electrically coupled with the processor 1550. There may be a single array 102 or multiple arrays 102 electrically coupled with processor 1550 as denoted by 1561. Gain calculator 1513 may implement array shading (e.g., flow 1300 of FIG. 13) by adjusting the gain Ge applied to amplifiers A coupled to speakers S at edge portions of the array 102 to be less than a gain Gm applied to amplifiers A coupled to speakers S at middle portions of the array 102. For example, after applying array shading, gain Gm is greater than gain Ge (e.g., see Gm, Ge in FIG. 16). Speaker position x accessed from speaker data 1531 may be used to determine which speaker positions x in array 102 have gain Ge applied to their amplifiers and which positions x in array 102 have gain Gm applied to their amplifiers. As another example, if array 102 has 32 speakers S such that there are 32 speaker positions x, then eight speakers at each edge portion may have gain Ge applied to their respective amplifiers A and 16 speakers at the middle portion may have gain Gm applied to their respective amplifiers A. Gain Gm may vary among the speakers S in the middle portion. Gain Ge may vary among the speakers S in the edge portions.

Figure 16:
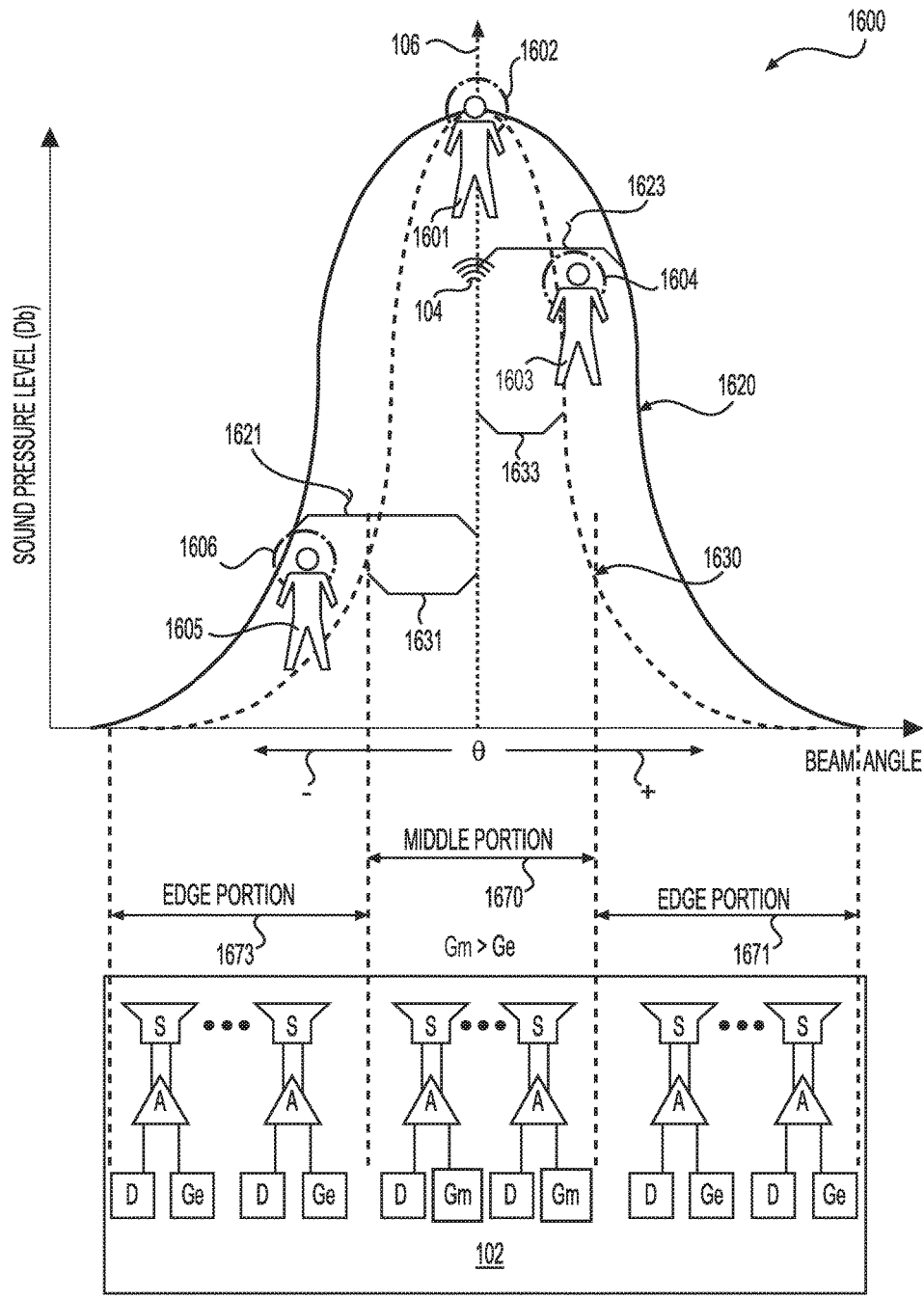
FIG. 16 depicts one example of array shading in an acoustic beam steering array.

FIG. 16 depicts one example 1600 of array shading in an acoustic beam steering array. In example 1600 of FIG. 16, the object in the environment the steered beam of acoustic energy is being directed at is a person 1601. A curve 1620 of a sound pressure level (e.g., in dB) as a function of an angle θ for the beam 104 of steered acoustic energy is depicted as having its maximum sound pressure level in the direction of propagation 106. Person 1601 ought to be able to audibly perceive 1602 the beam 104 (e.g., hear the audio information included in the audio signal) when person 1601 is positioned where the sound pressure level has its maximum. To the left and right of the direction of propagation 106 the sound pressure level of the beam 104 diminishes to sound pressure levels that are less than the maximum, but may still be audibly perceptible (1604 and 1606) by persons 1603 and 1605 positioned in side lobe regions 1621 and 1623 of the beam 104. The person 1601 that the beam is intended to acoustically alert may be positioned at the coordinate of the object (e.g., at a position indicated by angle θ); however, due to a conical spreading of the beam 104, persons 1603 and 1605 at angular positions within plus "+" or minus "−" the angle θ, may also perceive (1604 and 1606) the audio information in beam 104 and may react to it in an unpredictable manner. Accordingly, in some examples the side lobes in beam 104 may be reduced from 1623 to 1633 and 1621 to 1631 by applying shading (e.g., as depicted in dashed line curve 1630) to the gain G of speakers S in array 102. In curve 1630, the application of shading may result in persons 1603 and 1605 not being able to audibly perceive (1604 and 1606) the audio information in beam 104, or to perceive (1604 and 1606) the audio information in beam 104 at a lower sound pressure level.

In FIG. 16, speakers at edge portions 1671 and 1673 of the array 102 (e.g., speakers positioned towards an end of the array 102) may have their gain values set to Ge; whereas, speakers positioned in a middle portion 1670 (e.g., speakers positioned towards a center of the 102) of the array 102 may have their gain set to Gm, where gain Gm is greater than gain Ge (e.g., Gm>Ge). Creating a gain differential between the speakers in the edge portions 1671 and 1673 and the middle portion 1670 may reduce the side lobes so that the sound pressure level perceived by persons 1603 and 1605 is reduced. In some examples, side lobe reduction may increase perceived sound pressure level at the position of the person 1601 due to the increased gain Gm applied to the amplifiers of the speakers in middle portion 1670 and/or reduced gain Ge applied to the amplifiers of the speakers in edge portions 1671 and 1673. Speaker position data x may be used to determine which speakers S in the array 102 will have gains Ge applied to their amplifiers and which speakers will have gains Gm applied to their amplifiers. Gain Gm may vary among the speakers in middle portion 1670. Gain Ge may vary among speakers in edge portion 1671, edge portion 1673, or both.

Figure 17:
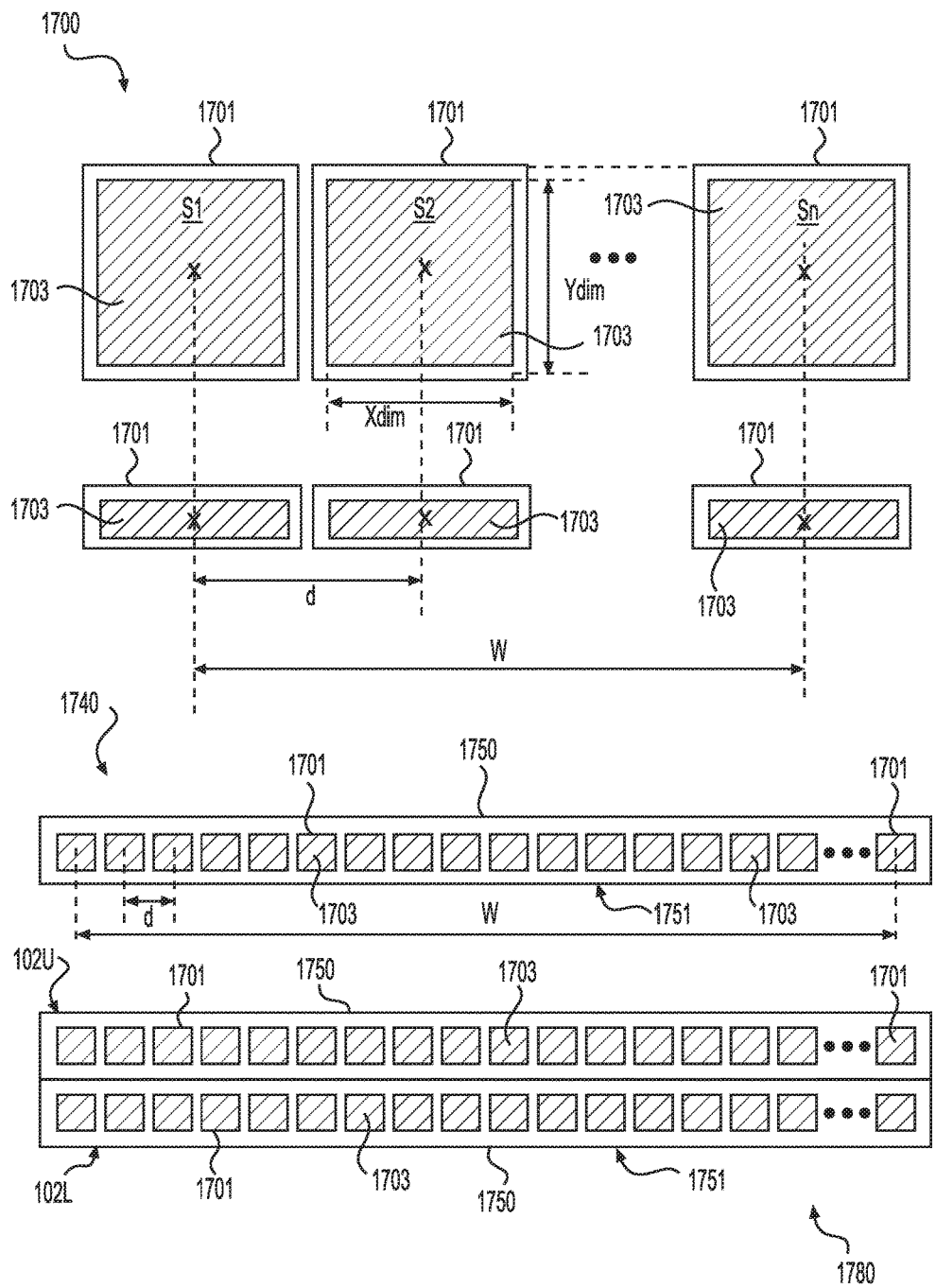
FIG. 17 depicts examples of speakers and speaker housings in an acoustic beam steering array.

FIG. 17 depicts examples of speakers and speaker housings in an acoustic beam steering array. In example 1700 each speaker S may include a frame 1701 and a sound radiating structure 1703 (e.g., a sound emitting surface of a piezoelectric or piezo ceramic transducer). In example 1700 speakers S1, S2-Sn are depicted having a square shape for frame 1701 and sound radiating structure 1703; however, the actual shapes, sizes and configuration of the speakers is not limited to the example 1700. For example, the speakers and/or their sound radiating structures may have a circular shape, a rectangular shape, a non-linear shape, or an arcuate shape, etc.

An x-dimension X-dim and a y-dimension Y-dim of the sound radiating structure 1703 may define the sound radiating surface area of the speaker. A spacing between adjacent speakers (e.g., between S1 and S3) may be d (as depicted in front and top plan views in example 1700) as measured from a center point "x" on the sound radiating structure 1703. Another reference point on the speakers may be selected and is not limited to center point "x" depicted in example 1700. A width W of the array 102 may be measured from the center point "x" of the first speaker S1 to the center point "x" of the last speaker Sn in the array 102.

In example 1740 the speakers may be mounted to a baffle, an enclosure or housing for the array 102 as denoted by structure 1750. The frame 1701 of each speaker may be connected with the structure 1750 using a fastener, glue, adhesive, welding or other coupling technique. For autonomous vehicles 100 having multiple arrays 102, the size (e.g., width W) and number of speakers in each array may be the same or may vary among the multiple arrays 102. For example, arrays 102 positioned on sides of the vehicle 100 (e.g., arrays C and D in FIGS. 8-10B) may have longer widths W due to the sides of the vehicle 100 being longer; and therefore, arrays C and D may have more speakers within the width W, than arrays A and B, for example. A surface 1751 of the array 102 may be coupled with a surface of the vehicle 100 (e.g., the roof or surface 100u) to mount the array 102 to the vehicle 100. The structure 1750 the speakers are mounted to need not be a planar surface and the configuration of the structure 1750 is not limited to the examples in FIG. 17. As one example, the structure may be a non-linear surface or an arcuate surface.

In example 1780, two or more arrays 102 may be stacked upon each other. The upper array 102U and the lower array 102L may have their respective beams 104 of steered acoustic energy steered at different objects in the environment and arrays 102U and 102L may be operated independently of each other. A center point of the stacked arrays 102U and 102L need not have orientations that are identical and may face in different directions. Upper array 102U may be coupled with lower array 102L using a fastener, glue, adhesive, welding or other coupling technique. A surface 1751 of the lower array 102L may be coupled with a surface of the vehicle 100 (e.g., the roof or surface 100u) to mount the stacked arrays 102U and 102L to the vehicle 100.

The x-dimension X-dim and a y-dimension Y-dim of the sound radiating structure 1703 may be determined in part by a wavelength (e.g., a frequency of sound) the array 102 is designed for. As one example, the array 102 may be designed to emit sound in a frequency range from about 250 Hz to about 8 kHz or in a range from about 400 Hz to about 4 KHz. For frequencies below about 400 Hz, bandpass filtering of the audio signal (e.g., using a low pass filter LPF)

may be used to attenuate the frequencies below about 400 Hz. Similarly, for frequencies above about 4 kHz, bandpass filtering of the audio signal (e.g., using a high pass filter HPF) may be used to attenuate the frequencies above about 4 kHz. The x-dimension X-dim and a y-dimension Y-dim may be in a range from about 20 mm to about 60 mm for speakers selected to emit sound at frequencies audible to humans, such as pedestrians and the like.

In other examples, the array 102 may include speakers designed to emit sound at ultrasonic frequencies that are above the range of human hearing. The x-dimension X-dim and a y-dimension Y-dim may be in a range from about 2 mm to about 8 mm for speakers selected to emit sound at ultrasonic frequencies. An array 102 having ultrasonic transduces for its speakers may have 300 or more (e.g., n≥300) of the ultrasonic transduces in the array 102, as opposed to approximately one-tenth the number of speakers for array 102 having transducers that emit sound at frequencies compatible with human hearing.

Sound 104 emitted at ultrasonic frequencies may distort in the atmosphere down to human audible frequencies (e.g., below about 20 kHz) at the object the beam 104 is being steered at, so that at the location of the object, the sound waves are audibly perceived as an acoustic alert, even though the original beam source was at an ultrasonic frequency. A beam width at the location of the object may be narrower for beam 104 that is emitted at ultrasonic frequencies (e.g., from about 4 degrees to about 10 degrees). In contrast, beam 104 emitted at frequencies within the range of human hearing may have a beam width in a range from about 20 degrees to about 35 degrees.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A method comprising:
   calculating a trajectory of an autonomous vehicle in an environment, the autonomous vehicle including an acoustic beam steering array, the acoustic beam steering array including at least a first speaker adjacent to a second speaker, wherein the first speaker is spaced from the second speaker by a wave front distance;
   determining a location of an object disposed in the environment, the object having an object type;
   predicting an object trajectory of the object based at least in part on the object type and the location of the object;
   estimating a threshold location in the environment based at least in part on the object trajectory and the trajectory of the autonomous vehicle, the threshold location associated with an acoustic alert;
   selecting an audio signal to associate with the acoustic alert;
   detecting that the location of the object is coincident with the threshold location;
   determining, based at least in part on the location of the object, a direction of propagation to emit a beam of steered acoustic energy;
   calculating, based at least in part on the wave front distance and a speed of sound, a first signal delay associated with the first speaker;
   calculating, based at least in part on the wave front distance and the speed of sound, a second signal delay associated with the second speaker; and
   causing the acoustic beam steering array to emit the beam of steered acoustic energy by at least delaying-application of the audio signal to a signal input of one or more amplifiers coupled with the first speaker and the second speaker by one or more times based at least on one or more of the first signal delay or the second signal delay.

2. The method of claim 1, further comprising:
   identifying a change in a driving operation of the autonomous vehicle,
   and wherein selecting the audio signal is based at least in part on the change in the driving operation.

3. The method of claim 2, further comprising:
   capturing sound associated with the driving operation of the autonomous vehicle, and
   adjusting one or more characteristics of the audio signal based at least in part on the sound.

4. The method of claim 1, wherein the threshold location comprises a plurality of threshold locations, and wherein selecting the audio signal comprises selecting the audio signal based at least in part on a threat level.

5. The method of claim 1, wherein the object comprises a first object, and wherein the method further comprises:
   detecting a second object in the environment;
   identifying an object type for the second object;
   associating a first priority with the first object based at least in part on the object type for the first object;
   associating a second priority with the second object based at least in part on the object type for the second object; and
   determining to process data related to the first object before processing data related to the second object based at least in part on the first priority being a higher priority than the second priority.

6. The method of claim 5, wherein associating the first priority comprises determining one or more of a motion of the first object the location of the first object, a predicted motion of the first object and the trajectory of the autonomous vehicle.

7. The method of claim 1, further comprising activating a system of the autonomous vehicle based at least in part on the object trajectory of the object, wherein the system is one or more of a braking system, a propulsion system, and a signaling system.

8. The method of claim 1, wherein the acoustic beam steering array is a first acoustic beam steering array and the autonomous vehicle includes a second acoustic beam steering array, and wherein the method further comprises:
   selecting one of the first acoustic beam steering array or the second acoustic beam steering array to emit the beam of steered acoustic energy based at least in part on a direction of travel of the autonomous vehicle, wherein the autonomous vehicle is configured to travel bi-directionally, and wherein the first acoustic beam steering array is disposed on a first half of the autonomous vehicle, and the second acoustic beam steering array is disposed on a second half of the autonomous vehicle.

9. The method of claim 1, further comprising:
   accessing drive operation sounds of the autonomous vehicle; and
   modulating the audio signal using the drive operation sounds.

10. The method of claim 1, further comprising:
    generating, at a perception system, the location of the object;

receiving, at the acoustic beam steering array, the location of the object, the acoustic beam steering array being in communication with the perception system;

receiving, at a planner system in communication with the perception system, the location of the object, an object track, and data representing an object classification;

accessing, by the planner system, data representing object types;

comparing, at the planner system, the object classification and the object track with the data representing the object types to determine the object type;

accessing, by the planner system, object dynamics; and comparing, at the planner system, the object type and the location of the object with the data representing the object dynamics to determine the object trajectory.

11. A system, comprising:

sensors operative to generate sensor data for an autonomous vehicle located within an environment;

an acoustic beam steering array operative to emit a beam of steered acoustic energy into the environment, the acoustic beam steering array including at least a first speaker adjacent to a second speaker, wherein the first speaker is spaced from the second speaker by a wave front distance;

one or more amplifiers coupled to the first speaker and the second speaker; and one or more processors configured to perform acts comprising:

determining a location of an object disposed in the environment based at least in part on the sensor data;

selecting an audio signal to associate with an acoustic alert;

determining a direction of propagation to emit the beam of steered acoustic energy, wherein the direction is based at least in part on the location of the object;

calculating a signal delay based at least in part on the wave front distance; and causing the acoustic beam steering array to emit the beam of steered acoustic energy by at least delaying application of the audio signal based at least in part on the signal delay.

12. The system of claim 11, wherein the acts further comprise:

predicting a trajectory of the object based at least in part on an object type associated with the object and the location of the object; and estimating a threshold location in the environment based at least in part on the trajectory of the object, and wherein causing the acoustic beam steering array to emit the beam of steered acoustic energy is based at least in part on detecting that the object is coincident with the threshold location.

13. The system of claim 11, further comprising one or more microphones operative to capture sound; and wherein the acts further comprise identifying a change in a driving operation of the autonomous vehicle based at least in part on the sound; and wherein selecting the audio signal is based at least in part on the change in the driving operation.

14. The system of claim 11, further comprising one or more microphones operative to capture sound; and wherein the acts further comprise adjusting one or more characteristics of the audio signal based at least in part on the sound.

15. The system of claim 11, wherein the acts further comprise:

determining at least a first threshold location and a second threshold location based at least in part on a first trajectory of the autonomous vehicle and a second trajectory of the object;

identifying a first threat level associated with the first threshold location; and identifying a second threat level associated with the second threshold location, and wherein selecting the audio signal comprises selecting a first audio signal based at least in part on identifying the first threat level and selecting a second audio signal based at least in part on identifying the second threat level.

16. The system of claim 11, wherein the acts further comprise: determining calculating the signal delay comprises: calculating a first signal delay associated with the first speaker based at least in part on the wave front distance; and determining calculating a second signal delay associated with the second speaker based at least in part on the wave front distance; and delaying application of the audio signal based at least in part on the signal delay comprises delaying application of the audio signal to a signal input of at least one of the one or more amplifiers by one or more times based at least in part on one or more of the first signal delay or the second signal delay.

17. The system of claim 11, wherein the acts further comprise:

accessing speaker data associated with the first speaker and the second speaker, the speaker data including a first speaker position in the acoustic beam steering array and a second speaker position in the acoustic beam steering array;

calculating a first gain associated with the first speaker and a second gain associated with the second speaker, wherein one or more of the first speaker or the second speaker are coupled to an output of an amplifier having a gain input; and applying to the gain input one or more of the first gain or the second gain.

18. The system of claim 11, wherein the acts further comprise:

accessing drive operation sounds of the autonomous vehicle; and modulating the audio signal using the drive operation sounds.

19. The system of claim 11, wherein the acts further comprise:

determining an object type for the object;

accessing object dynamics based at least in part on the object type; and determining a trajectory of the object based at least in part on the object dynamics, and wherein determining the direction of propagation to emit the beam of steered acoustic energy is based at least in part on the trajectory.

20. The system of claim 11, wherein the object comprises a first object, and wherein the acts further comprise:

detecting a second object in the environment;

identifying a first object type for the first object;

identifying a second object type for the second object;

associating a first priority with the first object based at least in part on the first object type for the first object;

associating a second priority with the second object based at least in part on the second object type for the second object; and determining to process data related to the first object before processing data related to the second object based at least in part on the first priority being a higher priority than the second priority.

21. The system of claim 20, wherein associating the first priority comprises determining one or more of a motion of the first object, the location of the first object, a predicted motion of the first object, and a trajectory of the autonomous vehicle.

22. The system of claim 11, wherein the acts further comprise activating a control system of the autonomous vehicle based at least in part on a trajectory of the object, wherein the control system is one or more of a braking system, a propulsion system, and a signaling system.

23. The system of claim 11, wherein:
the acoustic beam steering array comprises a first acoustic beam steering array disposed on a first half of the autonomous vehicle;
the system further comprises a second acoustic beam steering array that is disposed on a second half of the autonomous vehicle; and
the autonomous vehicle is configured to travel bi-directionally.

24. The system of claim 11, the acts further comprising:
determining an initial location of the object;
predicting an object trajectory of the object based at least in part on the object type and the initial location of the object;
estimating a threshold location in the environment based at least in part on the object trajectory and the trajectory of the autonomous vehicle, the threshold location associated with the acoustic alert; and
detecting that the location of the object is coincident with the threshold location,
wherein causing the acoustic beam steering array to emit the beam of steered acoustic energy is based at least in part on detecting that the location of the object is coincident with the threshold location.

25. One or more non-transitory computer-readable media storing instructions that, when executed by one or more processors, cause the one or more processors to perform acts comprising:
calculating an autonomous vehicle trajectory in an environment;
determining a first location of an object disposed in the environment, the object having an object type;
predicting an object trajectory based at least in part on the object type and the first location of the object;
determining, based at least in part on the autonomous vehicle trajectory and the object trajectory, a threshold location in the environment;
associating the threshold location with emitting an acoustic alert;
selecting an audio signal to associate with the acoustic alert;
detecting that a second location of the object is coincident with the threshold location; and
based at least in part on detecting that the second location of the object is coincident with the threshold location, causing an acoustic beam steering array to emit a beam of steered acoustic energy indicative of the audio signal into the environment to convey information about the autonomous vehicle to the object.

26. The one or more non-transitory computer-readable media of claim 25, wherein determining the threshold location comprises determining the threshold location such that the autonomous vehicle can emit the beam of steered acoustic energy for a given period of time before the first trajectory of the autonomous vehicle intersects with the second trajectory of the object.

27. The one or more non-transitory computer-readable media of claim 25, wherein the threshold location comprises a first threshold location, the acoustic alert comprises a first acoustic alert, the audio signal comprises a first audio signal and the beam of steered acoustic energy comprises a first beam of steered acoustic energy, and wherein the acts further comprise:
determining, based at least in part on the autonomous vehicle and the object trajectory, a second threshold location in the environment;
associating the second threshold location with emitting a second acoustic alert;
selecting a second audio signal to associate with the second acoustic alert;
detecting that a third location of the object is coincident with the second threshold location; and
based at least in part on detecting that the third location of the object is coincident with the second threshold location, causing the acoustic beam steering array to emit a second beam of steered acoustic energy indicative of the second audio signal into the environment.

28. The one or more non-transitory computer-readable media of claim 27, wherein the first threshold location includes a greater distance from the autonomous vehicle than the second threshold location.

* * * * *